(12) United States Patent
Kadokura

(10) Patent No.: US 11,815,412 B2
(45) Date of Patent: Nov. 14, 2023

(54) STRAIN SENSOR WITH CONTOURED DEFLECTION SURFACE

(71) Applicant: Intuitive Surgical Operations, Inc., Sunnyvale, CA (US)

(72) Inventor: Grant M. Kadokura, Redwood City, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 127 days.

(21) Appl. No.: 17/291,486

(22) PCT Filed: Nov. 15, 2019

(86) PCT No.: PCT/US2019/061885
§ 371 (c)(1),
(2) Date: May 5, 2021

(87) PCT Pub. No.: WO2020/102778
PCT Pub. Date: May 22, 2020

(65) Prior Publication Data
US 2022/0003615 A1    Jan. 6, 2022

Related U.S. Application Data

(60) Provisional application No. 62/767,891, filed on Nov. 15, 2018.

(51) Int. Cl.
*G01L 1/22* (2006.01)
(52) U.S. Cl.
CPC .................................. *G01L 1/2237* (2013.01)

(58) Field of Classification Search
CPC ........ G01L 1/22; G01L 1/2231; G01L 1/2237
See application file for complete search history.

(56) References Cited

U.S. PATENT DOCUMENTS

| | | | | |
|---|---|---|---|---|
| 3,325,761 A | * | 6/1967 | McLellan | G01L 9/0055 338/42 |
| 3,358,511 A | * | 12/1967 | Bargen | G01L 9/0055 73/301 |
| 4,064,758 A | * | 12/1977 | Harrison | G01L 9/0055 338/42 |

(Continued)

FOREIGN PATENT DOCUMENTS

| DE | 1147411 B | 4/1963 |
|---|---|---|
| EP | 0590713 A2 | 4/1994 |

(Continued)

OTHER PUBLICATIONS

Machine translation of EP 0590713 (Year: 1993).*

(Continued)

*Primary Examiner* — Natalie Huls

(57) ABSTRACT

A force sensor includes an annular diaphragm that includes an inner perimeter and an outer perimeter; the diaphragm has an outer annular portion having a tapered thickness that increases with decreasing radial distance from the outer perimeter; the diaphragm has an inner annular portion having a tapered thickness that increases with decreasing radial distance from the inner perimeter; a first strain gauge at the outer annular portion; and a second strain gauge at the inner annular portion.

18 Claims, 18 Drawing Sheets

(56) References Cited

U.S. PATENT DOCUMENTS

| | | | |
|---|---|---|---|
| 4,146,864 A * | 3/1979 | Bethe | G01L 1/2231 73/862.633 |
| 4,507,170 A * | 3/1985 | Myhre | G01L 9/0051 216/33 |
| 5,024,107 A * | 6/1991 | Bethe | G01L 1/2231 73/862.622 |
| 5,333,504 A * | 8/1994 | Lutz | G01L 19/0618 73/726 |
| 5,625,576 A | 4/1997 | Massie et al. | |
| 5,784,542 A | 7/1998 | Ohm et al. | |
| 5,855,583 A | 1/1999 | Wang et al. | |
| 6,005,199 A * | 12/1999 | Harada | G01L 1/2231 73/862.632 |
| 6,197,017 B1 | 3/2001 | Brock et al. | |
| 6,331,181 B1 | 12/2001 | Tierney et al. | |
| 6,394,998 B1 | 5/2002 | Wallace et al. | |
| 6,459,926 B1 | 10/2002 | Nowlin et al. | |
| 6,494,882 B1 | 12/2002 | Lebouitz et al. | |
| 6,594,552 B1 | 7/2003 | Nowlin et al. | |
| 6,730,021 B2 | 5/2004 | Vassiliades, Jr. et al. | |
| 6,817,974 B2 | 11/2004 | Cooper et al. | |
| 6,994,708 B2 | 2/2006 | Manzo | |
| 7,083,571 B2 | 8/2006 | Wang et al. | |
| 7,169,141 B2 | 1/2007 | Brock et al. | |
| 7,441,470 B2 * | 10/2008 | Morimoto | G01P 15/123 73/862.045 |
| 7,935,130 B2 | 5/2011 | Williams | |
| 8,256,306 B1 * | 9/2012 | Bauer | G01L 1/2231 73/862.474 |
| 8,306,656 B1 | 11/2012 | Schaible et al. | |
| 8,444,631 B2 | 5/2013 | Yeung et al. | |
| 8,479,969 B2 | 7/2013 | Shelton, IV | |
| 8,506,555 B2 | 8/2013 | Ruiz Morales | |
| 8,551,115 B2 | 10/2013 | Steger et al. | |
| 8,602,288 B2 | 12/2013 | Shelton, IV et al. | |
| 8,620,473 B2 | 12/2013 | Diolaiti et al. | |
| 8,628,518 B2 | 1/2014 | Blumenkranz et al. | |
| 8,771,270 B2 | 7/2014 | Burbank | |
| 8,800,838 B2 | 8/2014 | Shelton, IV | |
| 8,945,095 B2 | 2/2015 | Blumenkranz et al. | |
| 9,028,494 B2 | 5/2015 | Shelton, IV et al. | |
| 9,204,923 B2 | 12/2015 | Manzo et al. | |
| 9,232,979 B2 | 1/2016 | Parihar et al. | |
| 9,671,860 B2 | 6/2017 | Ogawa et al. | |
| 9,707,684 B2 | 7/2017 | Ruiz et al. | |
| 9,782,214 B2 | 10/2017 | Houser et al. | |
| 9,952,107 B2 | 4/2018 | Blumenkranz et al. | |
| 10,085,809 B2 | 10/2018 | Blumenkranz et al. | |
| 10,130,366 B2 | 11/2018 | Shelton, IV et al. | |
| 10,201,365 B2 | 2/2019 | Boudreaux et al. | |
| 10,219,874 B2 | 3/2019 | Yu et al. | |
| 10,238,458 B2 | 3/2019 | Verner et al. | |
| 10,398,433 B2 | 9/2019 | Boudreaux et al. | |
| 10,653,435 B2 | 5/2020 | Shelton, IV et al. | |
| 10,682,141 B2 | 6/2020 | Moore et al. | |
| 10,881,280 B2 | 1/2021 | Baez, Jr. | |
| 2003/0135203 A1 | 7/2003 | Wang et al. | |
| 2005/0096502 A1 | 5/2005 | Khalili | |
| 2005/0119527 A1 | 6/2005 | Banik et al. | |
| 2007/0005002 A1 | 1/2007 | Millman et al. | |
| 2007/0043338 A1 | 2/2007 | Moll et al. | |
| 2007/0078484 A1 | 4/2007 | Talarico et al. | |
| 2007/0119274 A1 | 5/2007 | Devengenzo et al. | |
| 2007/0156019 A1 | 7/2007 | Larkin et al. | |
| 2008/0009838 A1 | 1/2008 | Schena et al. | |
| 2008/0046122 A1 | 2/2008 | Manzo et al. | |
| 2008/0065105 A1 | 3/2008 | Larkin et al. | |
| 2008/0132893 A1 | 6/2008 | D'Amelio et al. | |
| 2008/0221391 A1 | 9/2008 | Weitzner et al. | |
| 2009/0088774 A1 | 4/2009 | Swarup et al. | |
| 2010/0063478 A1 | 3/2010 | Selkee | |
| 2010/0219388 A1 | 9/2010 | Schena | |
| 2010/0313679 A1 | 12/2010 | Larkin et al. | |
| 2011/0071543 A1 | 3/2011 | Prisco et al. | |
| 2011/0277775 A1 | 11/2011 | Holop et al. | |
| 2011/0282356 A1 | 11/2011 | Solomon et al. | |
| 2011/0295269 A1 | 12/2011 | Swensgard et al. | |
| 2011/0295270 A1 | 12/2011 | Giordano et al. | |
| 2012/0123441 A1 | 5/2012 | Au et al. | |
| 2013/0291654 A1 | 11/2013 | Blumenkranz et al. | |
| 2014/0005662 A1 | 1/2014 | Shelton, IV | |
| 2014/0005678 A1 | 1/2014 | Shelton, IV et al. | |
| 2014/0065708 A1 | 1/2014 | Shelton, IV | |
| 2014/0238174 A1 * | 8/2014 | Ikebe | G01L 5/009 73/862.621 |
| 2014/0257333 A1 | 9/2014 | Blumenkranz | |
| 2015/0150635 A1 | 6/2015 | Kilroy et al. | |
| 2015/0374447 A1 | 12/2015 | Blumenkranz et al. | |
| 2016/0216167 A1 | 7/2016 | Blumenkranz et al. | |
| 2017/0007345 A1 | 1/2017 | Smith et al. | |
| 2017/0165017 A1 | 6/2017 | Chaplin et al. | |
| 2017/0172687 A1 | 6/2017 | Smith et al. | |
| 2017/0215944 A1 | 8/2017 | Keffeler | |
| 2018/0042689 A1 | 2/2018 | Mozdzierz et al. | |
| 2018/0078249 A1 | 3/2018 | Stoy et al. | |
| 2019/0069966 A1 | 3/2019 | Petersen et al. | |
| 2019/0094084 A1 | 3/2019 | Swinehart et al. | |
| 2019/0125354 A1 | 5/2019 | Deck et al. | |
| 2019/0175188 A1 | 6/2019 | Pv R | |
| 2019/0175887 A1 | 6/2019 | Shameli | |
| 2019/0201018 A1 | 7/2019 | Shelton, IV et al. | |
| 2019/0223960 A1 | 7/2019 | Chaplin et al. | |
| 2019/0231464 A1 | 8/2019 | Wixey et al. | |
| 2019/0336228 A1 | 11/2019 | Blumenkranz et al. | |
| 2020/0278265 A1 | 9/2020 | Suresh | |
| 2021/0022819 A1 | 1/2021 | Duque et al. | |
| 2021/0033478 A1 * | 2/2021 | Shang | G01L 9/0055 |
| 2021/0045819 A1 | 2/2021 | Castillo et al. | |
| 2021/0401524 A1 | 12/2021 | Suresh et al. | |

FOREIGN PATENT DOCUMENTS

| | | | |
|---|---|---|---|
| EP | 2362285 A2 | 8/2011 | |
| EP | 2431000 A2 | 3/2012 | |
| KR | 100778387 B1 | 11/2007 | |
| WO | WO-2012166806 A1 | 12/2012 | |
| WO | WO-2017064303 A1 | 4/2017 | |
| WO | WO-2018049217 A1 | 3/2018 | |
| WO | WO-2019099562 A1 | 5/2019 | |
| WO | WO-2020102774 A1 | 5/2020 | |
| WO | WO-2020102776 A1 | 5/2020 | |
| WO | WO-2020102780 A1 | 5/2020 | |
| WO | WO-2021055276 A1 | 3/2021 | |
| WO | WO-2021076765 A1 | 4/2021 | |
| WO | WO-2021097386 A1 | 5/2021 | |
| WO | WO-2022056213 A1 | 3/2022 | |
| WO | WO-2022132885 A1 | 6/2022 | |

OTHER PUBLICATIONS

International Search Report and Written Opinion for Application No. PCT/US2019/061885, dated Mar. 6, 2020, 25 pages.

Mertmann M., et al., "Grippers for the Micro Assembly Containing Shape Memory Actuators and Sensors," Le Journal de Physique IV France 7 (1997), Conference C5, Supplement of Journal de Physique III of Nov. 1997, pp. C5-621-C5-626.

Vertut, Jean and Phillipe Coiffet, Robot Technology Teleoperation and Robotics Evolution and Development, English translation, Prentice-Hall, Inc., Inglewood Cliffs, NJ, USA 1986, vol. 3A, 332 pages.

* cited by examiner

STRAIN SENSOR WITH CONTOURED DEFLECTION SURFACE

CLAIM OF PRIORITY

This application is a U.S. national stage filing under 35 U.S.C. § 371 of International Application No. PCT/US2019/061885, entitled "STRAIN SENSOR WITH CONTOURED DEFLECTION SURFACE," filed Nov. 15, 2019, which claims the benefit of priority to U.S. Provisional Patent Application Ser. No. 62/767,891, entitled "STRAIN SENSOR WITH CONTOURED DEFLECTION SURFACE," filed on Nov. 15, 2018, each of the disclosures of which is incorporated by reference herein in its entirety.

BACKGROUND

A diaphragm strain sensor typically includes multiple strain gauges located upon a resilient deflectable planar diaphragm. The diaphragm often is mounted within and secured to a fixed-position outer frame. A moveable beam is mechanically coupled to the diaphragm such that a force imparted to move the beam perpendicular to the diaphragm causes deflection of the diaphragm in the direction of the force. The strain gauges may be used to measure the imparted force.

FIG. 1 is an illustrative top perspective view of a known diaphragm force sensor 102 that includes a thin annular planar diaphragm 104 suspended between a rigid outer support rim 106 and a center beam 108. The outer rim 106 extends about and is integrally secured to an outer perimeter portion 110 of the annular diaphragm 104. The center beam 108 is circumscribed by and integrally secured to an inner perimeter portion 112 of the annular diaphragm. A force imparted to the beam 108 in a direction perpendicular to the planar diaphragm 104 may deflect the diaphragm in a direction of the force. Strain gauges (not shown) are disposed upon the diaphragm at radial locations matched to the inner and outer dashed lines 114, 116, to sense strain imparted to the diaphragm due to the deflection.

FIG. 2 is an illustrative side cross-section view of the diaphragm force sensor 102 of FIG. 1 showing the diaphragm 104 in a planar layout with no deflection force imparted to the diaphragm. The diaphragm 104 has uniform thickness. The diaphragm 104 includes opposite facing planar first and second surfaces 118, 120. Inner first strain gauges 122 are disposed upon the second surface 120 at radial locations indicated by the first dashed line 114. Outer second strain gauges 124 are disposed upon the second surface 120 at radial locations indicated by the second dashed line 116. The beam 108 upstands from the inner perimeter portion 112 of the first surface 118 of the diaphragm 104, perpendicular to the planar first and second diaphragm surfaces 118, 120.

FIG. 3 is an illustrative side cross-section view of the diaphragm force sensor 102 of FIG. 1 showing the diaphragm 104 deflected by a deflection force F imparted by the beam 108. Deflection of the diaphragm 104 causes compression strain at an annular region of the diaphragm 104 matched to dashed lines 116. Deflection of the diaphragm 104 also causes tension strain at an annular inner region of the diaphragm 104 matched to dashed lines 114. In a typical diaphragm force sensor, a measure of a deflection force, F, may be determined based upon a combination of a measure of the peak compression strain and a measure of the peak tension strain.

FIG. 4 is an illustrative chart 402 showing strain at different radial locations of the deflected diaphragm of FIG. 3. The outer perimeter region 110 and the inner perimeter region 112 of the diaphragm 104 respectively closer to contact with the support frame 106 and closer to contact with the beam 108 are subjected to peak compression strain. An annular intermediate region matched with the dashed lines 114, disposed between the outer and inner perimeter regions 110, 112, is subjected to peak tension strain. More specifically, the chart 402 shows that deflection of the diaphragm 104 in response to a deflecting beam force F produces peak compression strain 404 concentrated narrowly at the outer annular region indicated by dashed lines 116. The deflection of the diaphragm 104 in response to the force F also produces peak tension strain 406 concentrated narrowly at the intermediate annular region located at dashed lines 114. Referring again to FIG. 1, dashed lines 114 and 116 indicate the radially narrow regions of peak compression strain 404 and peak tension strain 406 during deflection of the diaphragm 104.

Typical concentration of peak compression and peak tension strains at radially narrow diaphragm locations 114, 116 generally requires precise placement of the strain gauges 122, 124 to achieve accurate peak compression strain and peak tension strain measurements. Slight misalignment of the strain gauges with the peak compression and tension strain locations, therefore, may result in a sensor with low sensitivity or that produces reduced signal output.

SUMMARY

In one aspect, a force sensor includes an annular diaphragm integrally secured between an outer support region and an inner support region. The annular diaphragm includes an annular outer portion, an annular inner portion, and an annular intermediate portion between the outer and inner annular portions. The annular intermediate portion has a thickness that is less than a thickness of the outer support region and that is less than a thickness of the inner support region. The annular outer portion has a thickness that increases with increasing radial distance from the annular intermediate portion. The annular inner portion has a thickness that increases with increasing radial distance from the annular intermediate portion. A first strain gauge is disposed at the annular outer region and a second strain gauge disposed at the annular inner region.

In another aspect, a force sensor includes an annular diaphragm that includes an inner perimeter and an outer perimeter. The diaphragm has an outer annular portion having a tapered thickness that increases with decreasing radial distance from the outer perimeter. The diaphragm has an inner annular portion having a tapered thickness that increases with decreasing radial distance from the inner perimeter. A first strain gauge disposed at the outer annular portion. A second strain gauge disposed at the inner annular portion.

In yet another aspect, a force sensor includes a first beam having a longitudinal axis and including a first end region, a second end region, a center region, a first intermediate region between the first end region and the center region, and a second intermediate region between the second end region and the center region. The first end region and the center region each have greater thickness greater than a thickness of the first intermediate region. The second end region and the center region each have greater thickness than a thickness of the second intermediate region. The first intermediate region includes a first outer portion of tapered thickness that increases with increasing distance from the center region The first intermediate region also includes a first inner portion of tapered thickness that increases with increasing distance from the first end region. The second intermediate region includes a second outer portion of tapered thickness that increases with increasing distance from the center region. The second intermediate region also includes a second inner portion of tapered thickness that increases with increasing distance from the second end region. A second beam extending perpendicular to the longitudinal axis of the first beam and coupled to the first beam at the center region. A first strain gauge disposed within the first outer portion. A second strain gauge disposed within the second outer portion. A third strain gauge disposed within the first inner portion. A fourth strain gauge disposed within the second inner portion.

BRIEF DESCRIPTION OF DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals and/or letters in the various examples. This repetition is for the purpose of simplicity and clarity and does not in itself dictate a relationship between the various examples and/or configurations discussed.

DETAILED DESCRIPTION

Figure 1:
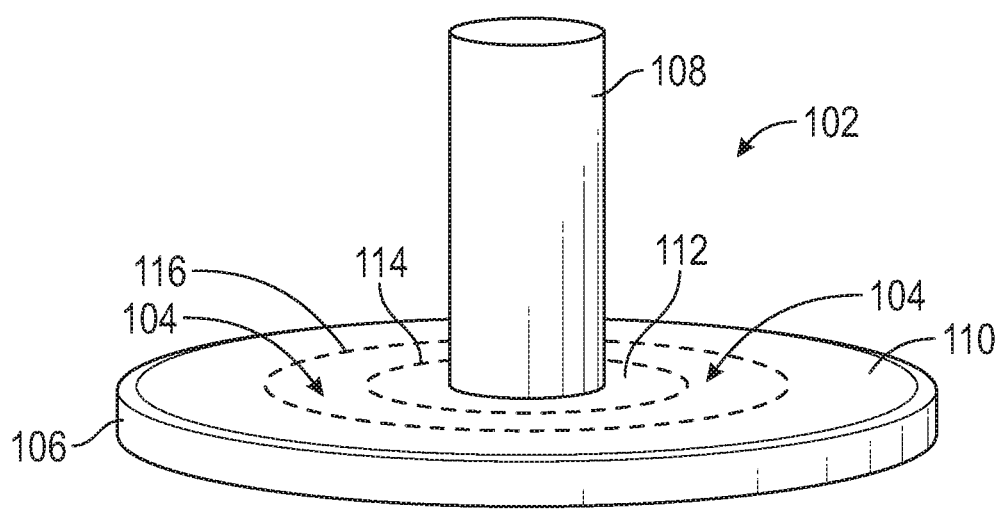
FIG. 1 is an illustrative top perspective view of a known diaphragm force sensor.
Figure 2:
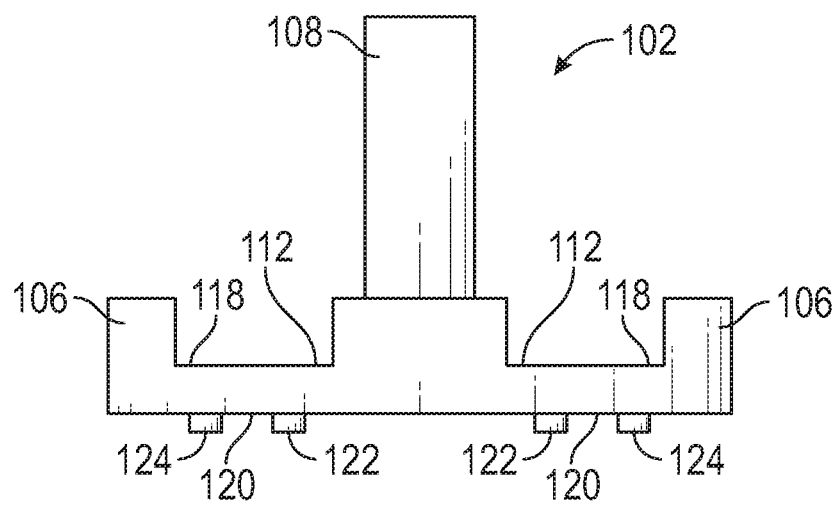
FIG. 2 is an illustrative side cross-section view of the uniform thickness diaphragm force sensor of FIG. 1 showing the diaphragm in a planar layout with no deflection force imparted to the diaphragm.
Figure 3:
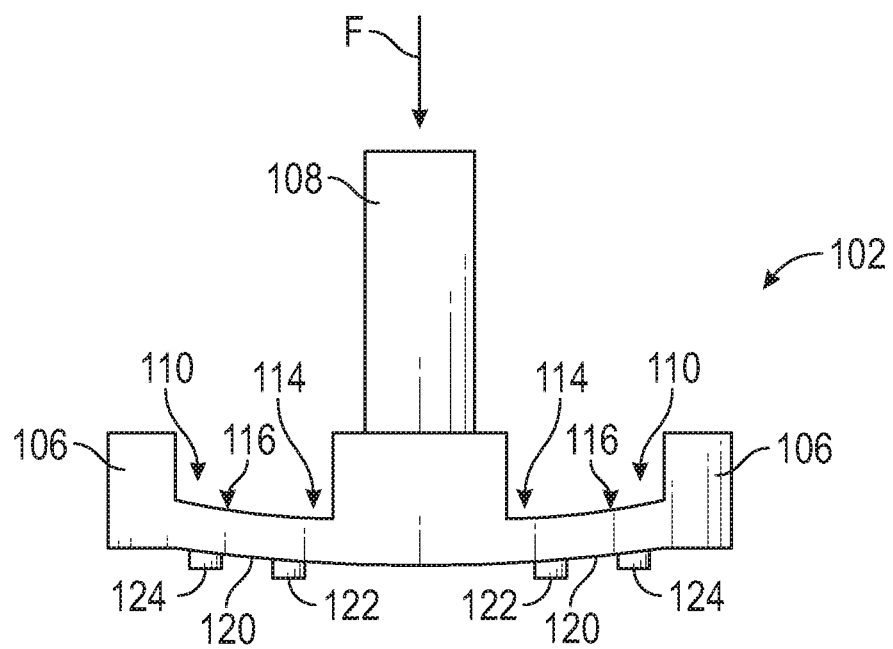
FIG. 3 is an illustrative side cross-section view of the uniform thickness diaphragm force sensor of FIG. 1 showing the diaphragm deflected by a deflection force.
Figure 4:
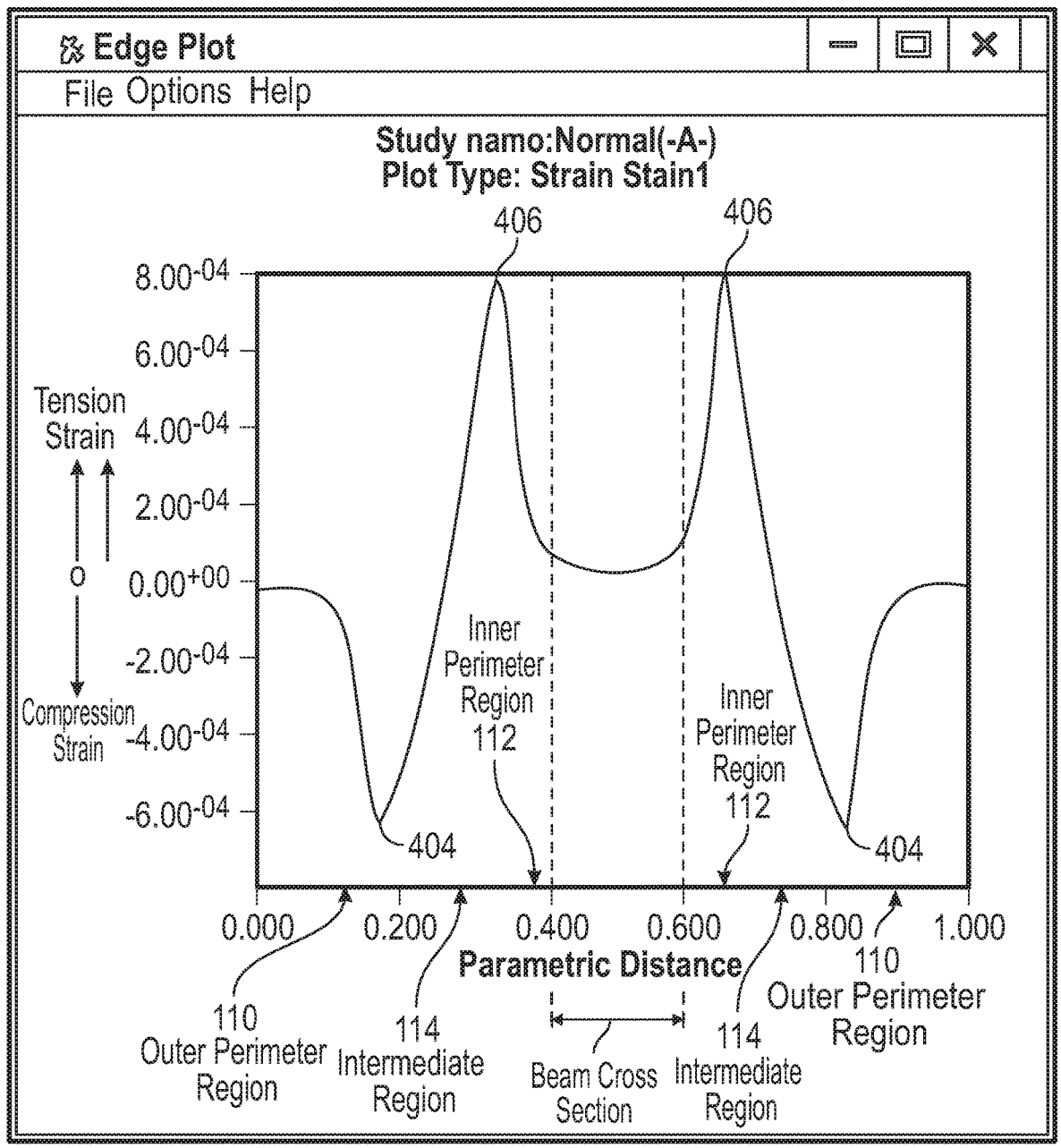
FIG. 4 is an illustrative chart showing variations in strain at different radial locations of the deflected diaphragm of FIG. 3.
Figure 5:
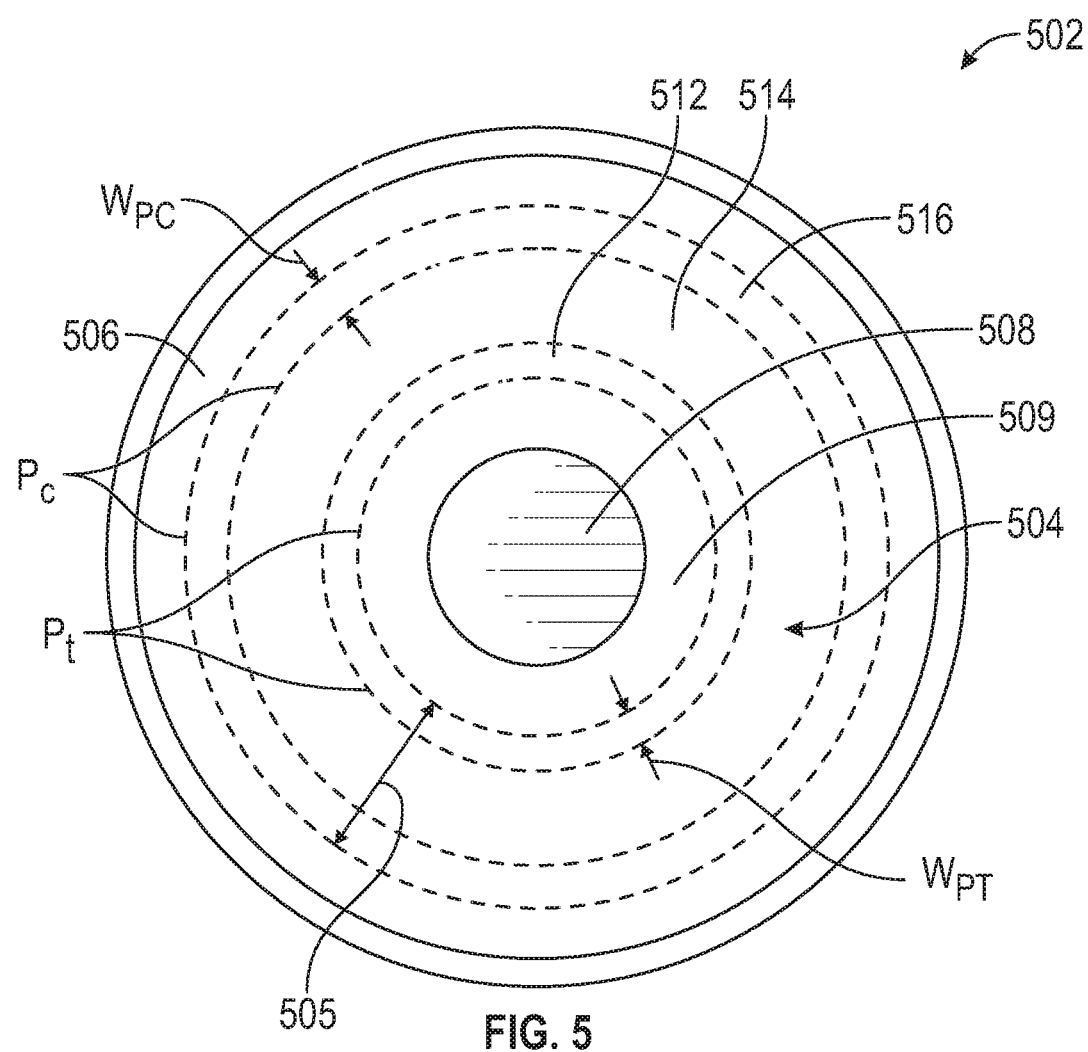
FIG. 5 is an illustrative top elevation view of a contoured diaphragm force sensor in accordance with some examples.

FIG. 5 is an illustrative top elevation view of a contoured diaphragm three sensor 502 in accordance with some examples. An annular diaphragm 504 is integrally secured to and suspended between a thicker outer support region 506 and a thicker inner support region 509. The outer support region 506 is secured to a fixed member 530, for example. A beam 508 that is movable longitudinally in a direction perpendicular to the diaphragm 504 is mechanically coupled to the inner support region 509. An outer portion of an annular outer perimeter portion 516 of the diaphragm 504 is secured to the outer support region 506. An inner portion of an annular inner perimeter portion 512 of the diaphragm 504 is secured to the inner support region 509. Thus, the diaphragm 504 is suspended between the inner support region 509 and the outer support region 506.

Thickness of the diaphragm 504 is contoured to vary with radial dimension to spread radial location of peak strain regions during deflection. In some examples, the variation in diaphragm thickness is tapered to provide wider regions of peak strain during deflection. The diaphragm 504 has a width indicated by arrow 505 that extends between the outer support region 506 and the inner support region 509. The diaphragm 504 has a cross-section profile inclined to have an increasing thickness with increasing radial distance from a center portion of the diaphragm width in an intermediate region 514 of the diaphragm 504 between the inner diaphragm perimeter portion 512 and the outer diaphragm perimeter portion 516, within a respective inner perimeter portion 512 and an outer perimeter portion 516 of the diaphragm 504. To avoid sharp corners in strain concentration at the inner diaphragm boundary between the diaphragm 504 and the inner support region 509, thickness of the diaphragm 504 increases with distance from diaphragm center at a sloped incline within the inner perimeter portion 512. To avoid sharp corners in strain concentration at an outer diaphragm boundary between the diaphragm 504 and the outer support region 506, thickness of the diaphragm 504 increases with distance from diaphragm center at a sloped incline within the outer perimeter portion 516. Thus, the diaphragm 504 has an outer region of tapered thickness that increases with decreasing radial distance from the outer support region 506 and has an inner region of tapered thickness that increases with decreasing radial distance from the inner support region 509.

During deflection, the sloped incline in diaphragm thickness within the inner perimeter portion 512 and the outer perimeter portion 516 spreads both peak tension strain and peak compression strain across wider portions of the diaphragm. Strain gauges (not shown) are disposed upon the diaphragm 504 in the inner perimeter portion 512 where peak tension strain concentrates and in the outer perimeter portion 516 where peak compression strain concentrates. The spreading of peak tension strain and peak compression strain across wider regions of the diaphragm 504, where diaphragm thickness increases with increasing radial distance from a center portion of the diaphragm width, permits locating strain gauges across corresponding wider regions of the diaphragm 504 in which peak tension strain and peak compression strain may occur. For example, annular peak compression strain regions are represented dashed lines labeled '$W_{PC}$', and annular peak tension strain regions are represented dashed lines labeled '$W_{PT}$'. An outer one of the $W_{PC}$ dashed lines represents an outer perimeter of the outer perimeter portion 516. An inner one of the $W_{PT}$ dashed lines represents an inner perimeter of the inner perimeter portion 512. Thus, less precision is required in the placement of the strain gauges to achieve accurate deflection force measurement. It will be understood that whether strain is compression or tensile often depends upon the direction of force. In examples herein, forces cause compression strain at outer portions of the diaphragm and cause tension strain at inner portions of the diaphragm.

In some examples, the diaphragm force sensor 502 is formed of a hard, resilient material such as steel, Titanium, Zirconium, or Aluminum alloys, for example. The contouring of the diaphragm 504 may be produced using a precision turning operation or electrical discharge machining (EDM). In some examples, the diaphragm 504 is formed thin enough for the strain gauges 522, 524 to sense forces in a range of 0.001 Newtons. The strain gauges 522, 542 may include classic foil strain gauges, custom flex circuits, or thin film laser etched gauge patterns.

Figure 6:
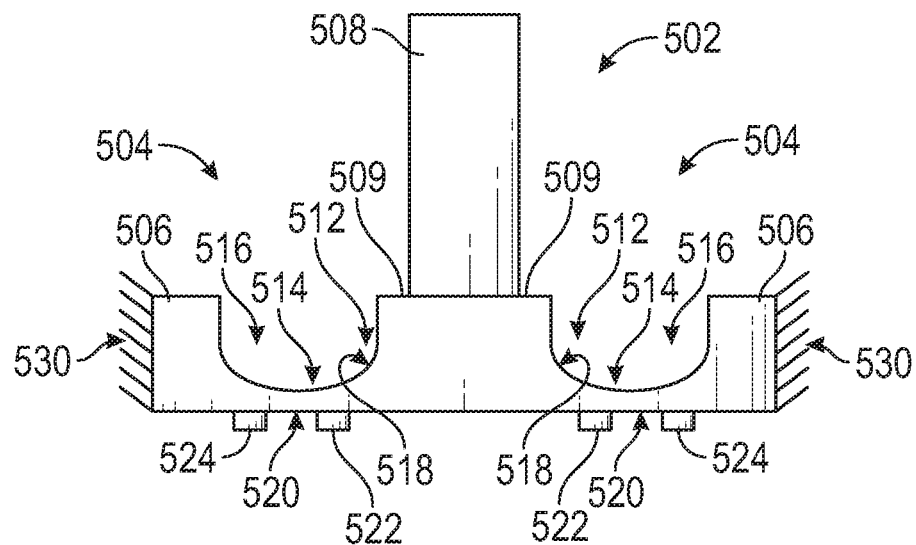
FIG. 6 is an illustrative side cross-section view of the contoured diaphragm force sensor of FIG. 5 at rest, with no deflection of the diaphragm.

FIG. 6 is an illustrative side cross-section view of the contoured diaphragm force sensor 502 of FIG. 5 at rest, with no deflection of the diaphragm 504. The diaphragm 504 includes opposite facing planar first and second surfaces 518, 520. The beam 508 upstands from an inner perimeter of the first surface 518, perpendicular to the diaphragm 504 in the rest state, when no force is imparted to the beam 508. A force imparted to the beam 508 in a direction perpendicular to the diaphragm 504 deflects the diaphragm in a direction of the force. Strain gauges 522, 524 disposed upon the second surface 520 of the diaphragm 504 provide signals indicative of magnitude of strain imparted to the diaphragm due to a deflection force.

With no force imparted to the beam, the diaphragm 504 is disposed in a substantially planar layout. The first surface 518 of the diaphragm 504 is contoured with thickness that increases with radial distance from the diaphragm center within the inner perimeter portion 512 and with thickness that increases with radial distance from the diaphragm center within the outer perimeter portion 516. The second surface 520 of the diaphragm 504 is substantially flat, Vertical thickness of the annular diaphragm is greatest at an outer perimeter region 516 of the diaphragm 504 closest to a juncture with the outer support region 506 and at an inner perimeter region 512 of the diaphragm closest to the inner support region 509 and the center beam 508. Vertical thickness of the annular diaphragm 504 is thinnest at the intermediate region 514 of the diaphragm approximately radially midway between the inner and outer regions 512, 516 of greatest thickness. Tapering of diaphragm thickness between the annular outer perimeter region 516 and the annular intermediate region 514 and between the annular inner perimeter region 512 and the annular intermediate region 514 is sufficiently gradual to avoid sharp strain concentration corners during deflection of the diaphragm 504. In some examples, tapering within the inner and outer portions 512, 516 has a slope profile of increasing thickness with increasing radial distance from the intermediate region 514 in a range between 0.5 in/in and 0.05 in/in. In some examples, the outer tapered contour region and the inner tapered contour region each has a radial width that is at least 15% percent of an overall radial width of the annular diaphragm.

Figure 7:
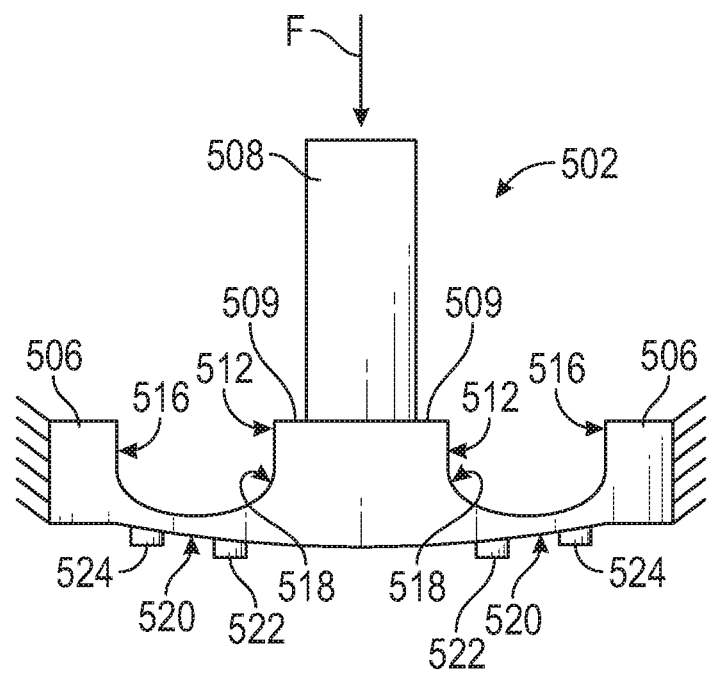
FIG. 7 is an illustrative side cross-section view of the contoured diaphragm force sensor of FIG. 5 under strain, with the diaphragm deflected in response to a deflection force.

FIG. 7 is an illustrative side cross-section view of the contoured diaphragm force sensor 502 of FIG. 5 under strain, with the diaphragm 504 deflected in response to a deflection force F. More particularly, a deflection force F imparted to the beam 508 in a direction perpendicular to a horizontal plane of the diaphragm 504 causes a corresponding movement of the beam 508 perpendicular to the at rest plane of the diaphragm 504, which imparts the deflecting force F causing the diaphragm to deflect in a direction of the force. Deflection of the diaphragm 504 causes peak compression strain within the annular outer portion 516 of the diaphragm 504 and causes peak tension strain within the annular inner portion 512 of the diaphragm 504. A measure of the deflection force F may be determined based upon simple curve fitting since the force is proportional to the strain, which involve a combination of a measure of the peak compression strain and a measure of the peak tension strain. Simple plate bending can also be used as an analytical rough approximation of the stress in the diaphragm.

Figure 8:
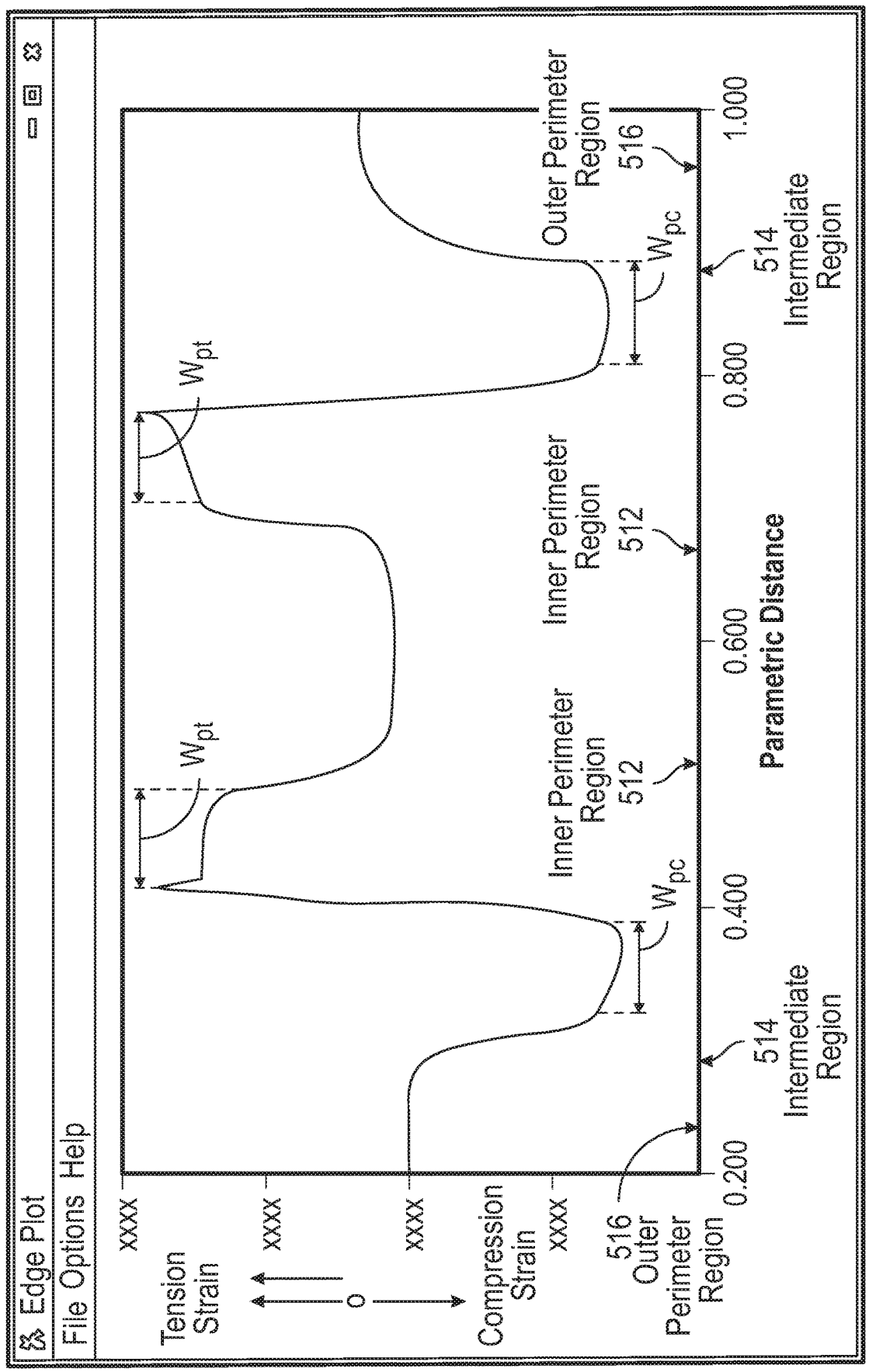
FIG. 8 is an illustrative chart showing variations in strain at different radial regions of the deflected diaphragm of FIG. 7.

FIG. 8 is an illustrative chart 802 showing variations in strain at different radial locations of the deflected diaphragm 504 of FIG. 7. An outer annular region 516 of the diaphragm 504 closer to contact with the support frame 506 is subjected to a tensile strain. An annular inner region 512 of the diaphragm 504 closer to contact with the beam 508 is subjected to compression strain. An annular intermediate region 514 of the diaphragm 504 between the outer and inner annular regions 516, 512 is the region where the strain transitions for tensile to compressive. The chart 802 of FIG. 8 shows that deflection of the diaphragm 504 in response to a deflecting beam force produces peak compression strain concentrated at the annular outer portion 516 having a width '$W_{PC}$' within the outer perimeter region 516 of the diaphragm 504 closer to the outer rim 506. The chart 802 also shows that deflection of the diaphragm 504 in response to the force also produces peak tension strain concentrated at the annular inner portion 512 having a width '$W_{PT}$' within the outer an intermediate region 512 of the diaphragm 504. In some examples, the thinner intermediate region 514 of the diaphragm is disposed approximately radially midway between the thicker annular outer and inner regions 516, 512 regions of the diaphragm 504.

Referring again to FIG. 5, dashed lines pc and pt indicate the respective radial regions of peak compression and peak tension during deflection of the diaphragm having respective widths $W_{PC}$ and $W_{PT}$. In some examples, the diaphragm 504 has a radial width in a range of approximately 0.25 to 2 inches. In some examples, the region pc of peak compression strain has a radial dimension $W_{PC}$ in a range of approximately $\frac{1}{6}^{th}$ to $\frac{1}{3}^{rd}$ of the web width. In some examples, the region pt of peak tension strain has a radial dimension $W_{PT}$ in a range of approximately $\frac{1}{6}^{th}$ to $\frac{1}{3}^{rd}$ of the web width. In some examples, the intermediate region 514 of the diaphragm has a minimal thickness in a range of approximately 0.004 inches. In some examples, the outer and inner perimeter regions 516, 512 of the diaphragm 504 have a maximum thickness in a range of approximately 0.04 inches. In some examples, a taper region between the outer perimeter region 516 and the intermediate region 514 of the diaphragm 504 has a radial width in a range of approximately $1/20^{th}$ to $1/2$ the web width. In some examples, a taper region between the inner perimeter region 512 and the intermediate region 514 of the diaphragm 504 has a radial width in a range of approximately $1/20^{th}$ to $1/2$ the web width. In some examples, a median slope of tapering of diaphragm thickness in the range of 0.05 to 2 in/in is sufficient to achieve increased radial widths of the regions of peak compression and peak tension, $W_{PC}$, $W_{PT}$, during deflection that are up to roughly 10% percent of the width of the web of the annular diaphragm 504.

Figure 9:
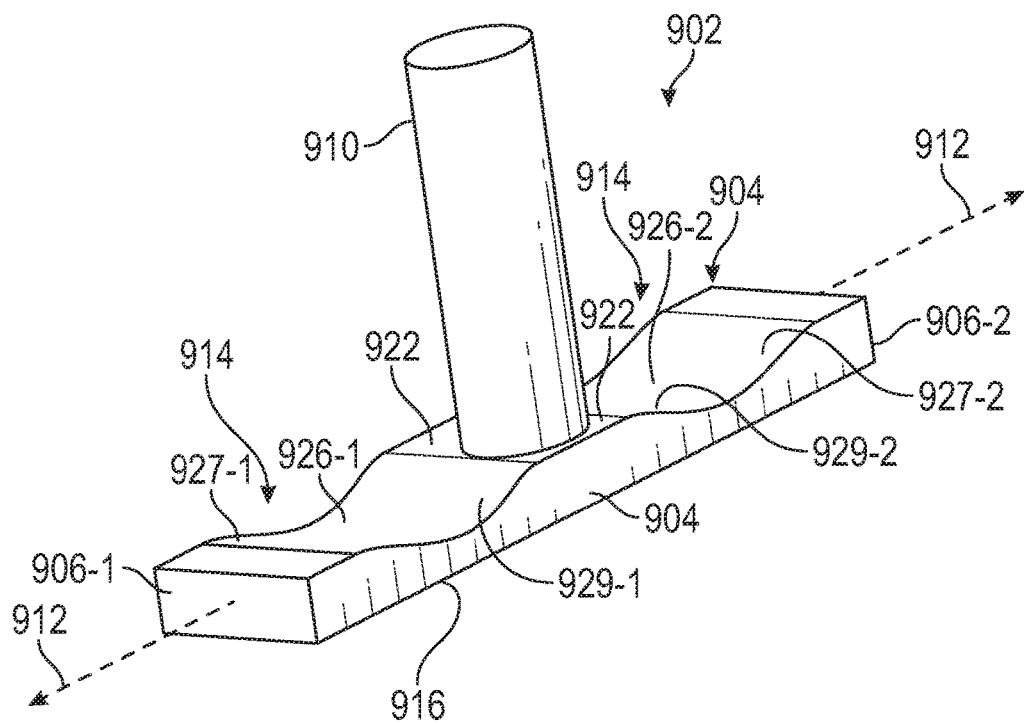
FIG. 9 is an illustrative perspective view of a tapered beam force sensor.

FIG. 9 is an illustrative perspective view of a tapered beam force sensor 902, A contoured first beam 904 may be suspended at a fixed support member (not shown). More particularly, opposite first and second end portions 906-1, 906-2 of the contoured first beam 904 are secured to the fixed support member. A force imparting second beam 910 capable of movement perpendicular to a longitudinal axis 912 of the suspended contoured first beam 904 is mechanically coupled to the contoured first beam 904 approximately midway along a longitudinal length of the contoured first beam 904. The contoured first beam 904 includes opposite facing first and second surfaces 914, 916. The firs surface 914 is contoured. The second surface 916 is planar. In a rest state, when no force is imparted to the second beam 910, the second beam 910 upstands from a center portion of the first beam 904, perpendicular to the longitudinal axis 912. A deflection force F imparted to the second beam deflects the first beam in a direction of the force. First and second strain gauges (not shown) disposed upon first beam 904 produce a signal indicative of magnitude of strain imparted to the first beam 904 due to the deflection.

Figure 10:
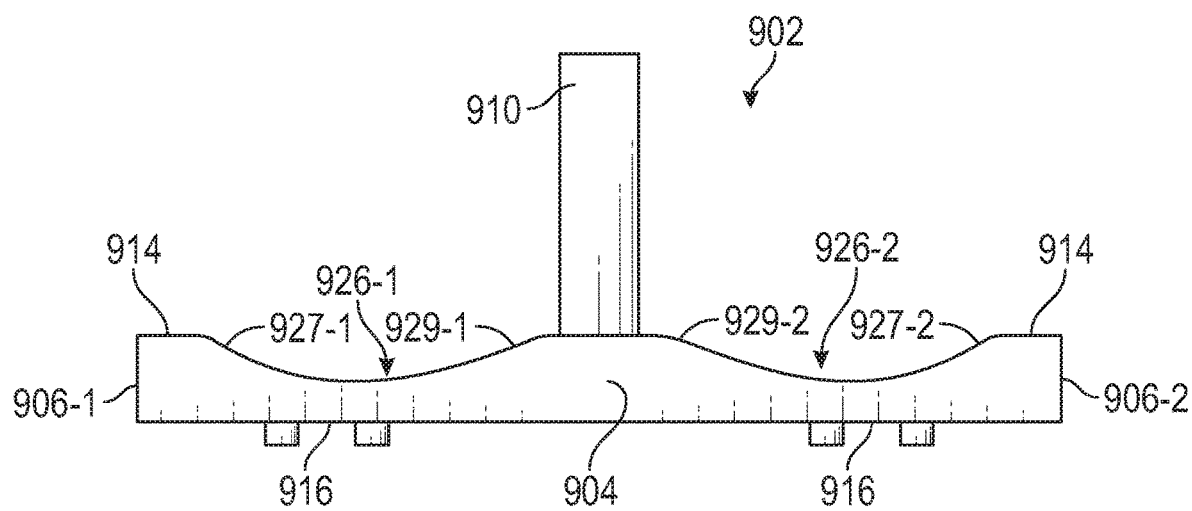
FIG. 10 is an illustrative side view of side view of the tapered beam force sensor of FIG. 9 without deflection.

FIG. 10 is an illustrative side view of side view of the tapered beam force sensor 902 of FIG. 9 at rest, with no deflection force. With no force imparted to the second beam 910, the first beam 904 is disposed in a substantially linear layout. The contoured first surface 914 of the first beam 904 is contoured. The second surface 916 of the first beam 904 is substantially planar. Cross-section thickness of the contoured first beam 904 is greatest at outer end regions 906-1, 906-2 of the first beam 904 on opposites sides of the second beam 910 and at a center portion 922 of the first beam 904. Cross-section thickness of the first beam 904 is thinnest at first and second intermediate regions 926-1, 926-2 of the first beam 904, each respectively, approximately midway between a respective outer end region 906-1, 906-2 and the center region 922, on opposite sides of the center beam 910.

More particularly, a first intermediate region 926-1 includes a first outer portion 927-1 having a tapered thickness that increases with increasing distance from the center region 922. The first intermediate region 926-1 also includes a first inner portion 929-1 having a tapered thickness that increases with increasing distance from the first end region 906-1.

A second intermediate region 926-2 includes a second outer portion 927-2 having a tapered thickness that increases with increasing distance from the center region 922. The second intermediate region 926-2 also includes a second inner portion 929-2 having a tapered thickness that increases with increasing distance from the second end region 906-2.

Figure 11:
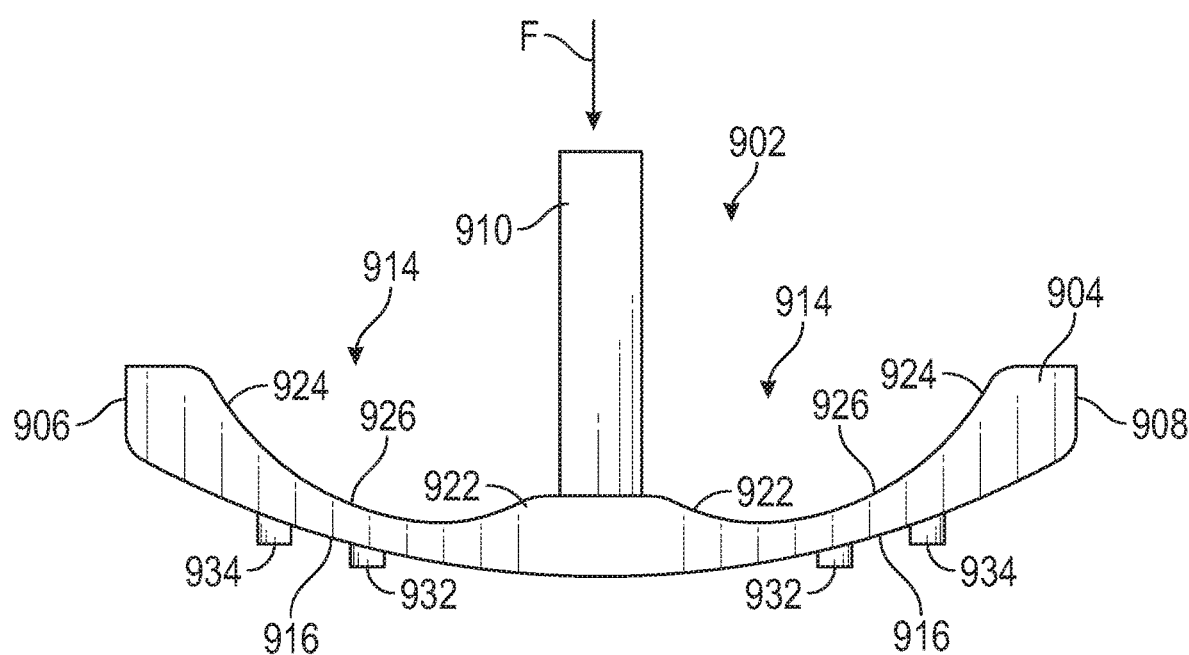
FIG. 11 is an illustrative side view of the tapered beam force sensor of FIG. 9 with deflection.

FIG. 11 is an illustrative side view of the tapered beam force sensor 902 of FIG. 9 deflected by a deflection force F.

The half symmetric shape of the cross section of the diaphragm is analogous to a fixed guided cantilever beam, where the outer region would be fixed. A deflection force imparted to the contoured first beam in a direction perpendicular to a longitudinal axis 912 of the contoured first beam 904 causes a corresponding movement of the force imparting second beam 910 in a direction perpendicular to the at rest linear layout of the first beam 904, which imparts a deflecting force causing the first beam to deflect in a direction of the deflection force. Deflection of the contoured first beam causes compression strain in some regions of the first beam 904 and causes tension strain in other regions of the first beam 904. A measure of the deflection force may be determined based upon signals produced by first and second strain sensors disposed on the second surface 916 of the first beam 904.

The top side of the thicker end portions 924 of the contoured first beam 904 are subjected to a tensile strain. The top side of regions 922 of the first beam 904 are subject to compressive strain. The tapering of first beam thickness between the respective end portions 924 and the intermediate regions 926 and the tapering of first beam thickness between the center portions 922 and the intermediate regions 926 causes spreading of peak compression strain and of peak tension strain so that strain gauges 932, 934 may be placed with less precision within wider areas of the contoured surface 914 without loss of strain measurement precision. First strain gauges 932 are disposed upon the second surface 916 within the intermediate region 922 to measure tension strain. Second strain gauges 934 are disposed upon the second surface 916 within the outer perimeter region 924 to measure compression strain.

Examples

Figure 12A:
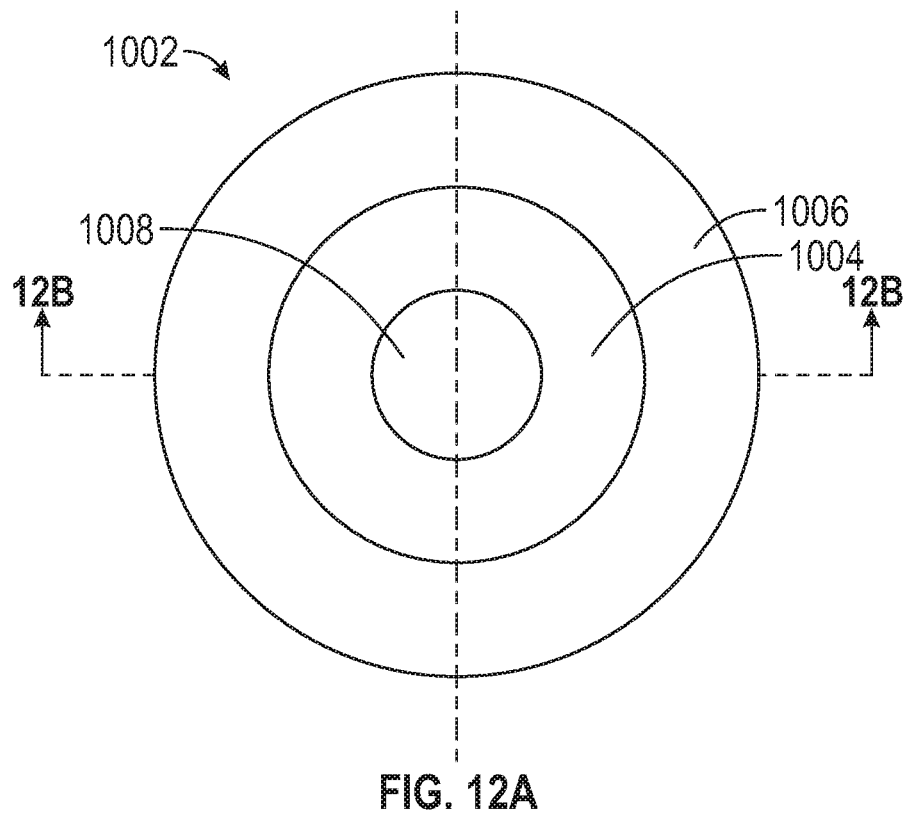
FIG. 12A is an illustrative top view of a first alternative example diaphragm strain sensor with a conventional diaphragm contour.
Figure 12B:
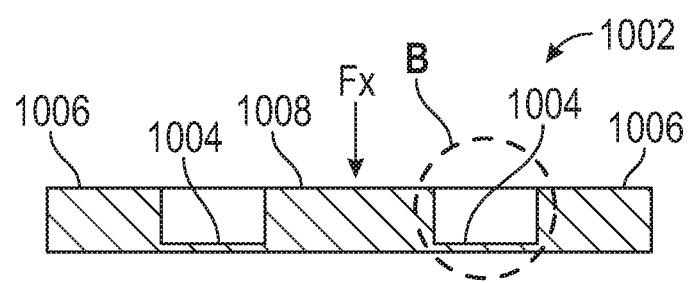
FIG. 12B is an illustrative side view of the first diaphragm strain sensor of FIG. 12A along lines A-A in at rest position (no force).
Figure 12C:
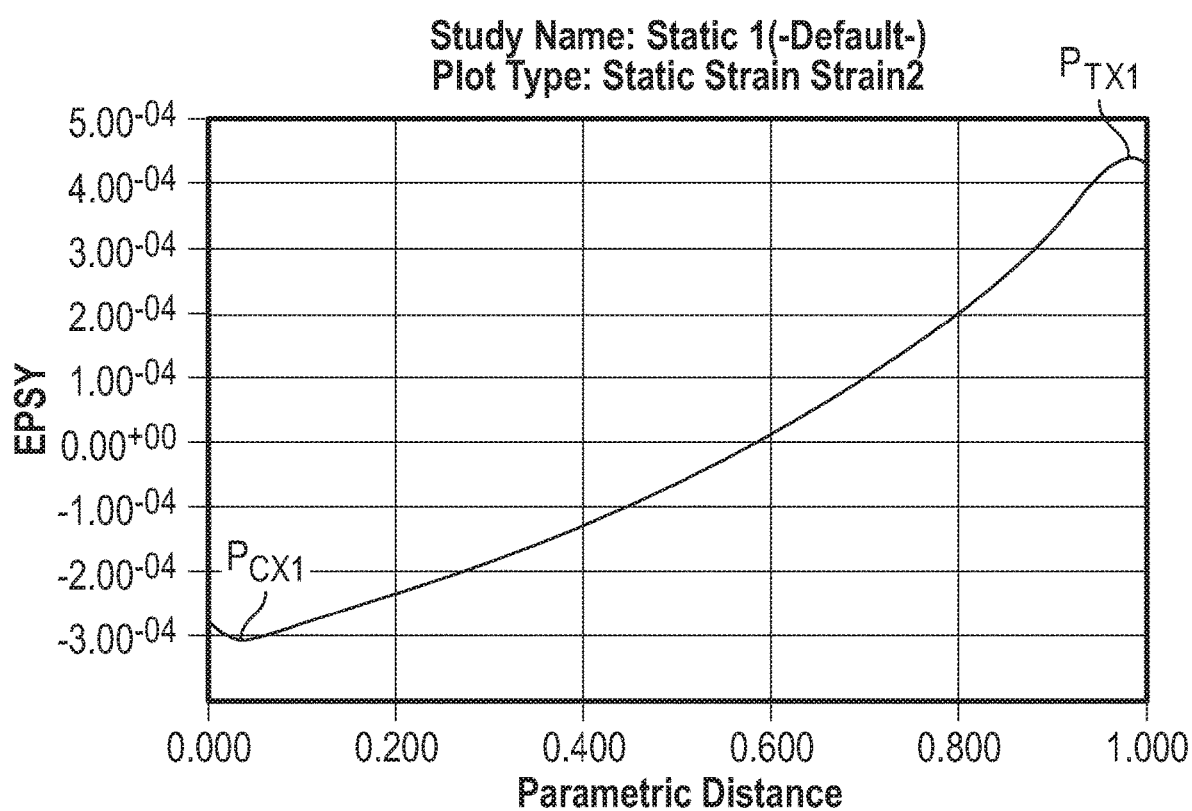
FIG. 12C is an illustrative strain graph that indicates strain distribution in the strain sensor of FIGS. 12A-12B near transitions in thickness between the thinned first diaphragm and thicker inner and outer support regions in response to a vertical downward force.

FIG. 12A is an illustrative top view of a first alternative example diaphragm strain sensor 1002 with a conventional diaphragm contour. FIG. 12B is an illustrative side view of the first diaphragm strain sensor 1002 along lines A-A in at rest position (no force). The first diaphragm strain sensor 1002 includes a thicker inner support region 1008, a thinner first diaphragm 1004 and a thicker outer support region 1006, which in the illustrative example are circular and concentric, as shown. The diaphragm region 1004 has uniform thickness. FIG. 12C is an illustrative strain graph that indicates strain distribution near transitions in thickness between the thinned first diaphragm 1004 and the thicker inner support region 1008 and the thicker outer support region 1006, in response to a vertical downward force Fx imparted at the inner support region 1008 that causes vertical downward deflection of the first diaphragm 1004 while the outer support region 1006 is maintained in a fixed relative position. As will be better appreciated from the full set of examples herein, the first example strain graph has narrow example peak compression $P_{Cx1}$ and example peak tension $P_{Tx1}$ regions.

Figure 13A:
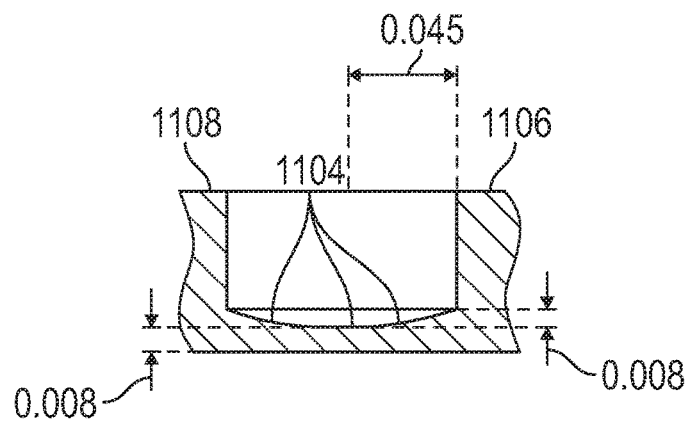
FIGS. 13A, 14A, 15A, 16A, 17A, 18A and 19A, show enlarged side views of alternative examples diaphragm strain sensors having the same layout as the first sensor of FIGS. 12A-12B but with different diaphragm contours.
Figure 13B:
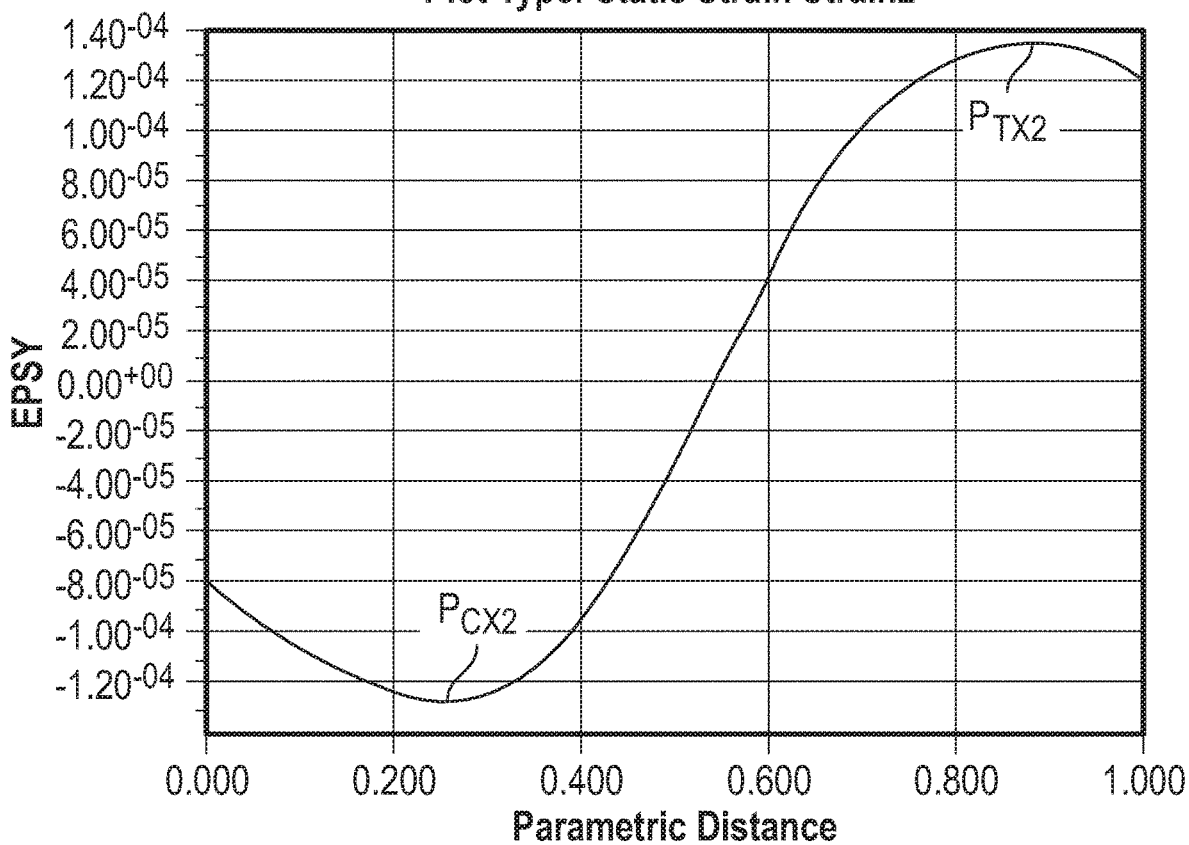
FIGS. 13B 14B, 15B, 16B, 17B, 18B and 19B are illustrative strain graphs that indicate strain distribution within the alternative examples diaphragm strain sensors of FIGS. 13A, 14A, 15A, 16A, 17A, 18A and 19A, imparted by, a vertical downward force Fx at inner support regions like that shown to be imparted to inner support region of FIG. 12A.

The following examples smooth-out thickness transitions between the thinned diaphragm and the thicker inner and outer support regions. The following FIGS. 13A, 14A, 15A, 16A, 17A, 18A and 19A, show enlarged side views of alternative example diaphragm strain sensors having the same layout as the first sensor 1002 but with different diaphragm contours. To simplify the explanation, only the enlarged portions within a region corresponding to the circle labeled "B" in FIG. 12B are shown, although it will be appreciated that each of the alternative examples includes a thicker inner support region, a thinner first diaphragm and a thicker outer support region, which are not shown. The difference between theses alternative examples is the diaphragm contour which is the focus of explanation. FIGS. 14B, 15B, 16B, 17B, 18B and 19B are illustrative strain graphs that indicates strain distribution within the alternative example diaphragms imparted by a vertical downward force Fx at inner support regions like that shown to be imparted to inner support region 1008 of FIG. 12A. FIG. 13A is an illustrative enlarged side view of a portion of a second diaphragm 1102, Thickness of the second diaphragm 1104 varies from 0.008 at the center of the second diaphragm to 0.016 at the inner and outer support regions 1108, 1106. The second diaphragm has an inclined profile of increasing thickness starting from the center portion of the diaphragm and extending to the inner and outer support regions 1108, 1106. FIG. 13B shows that a second example strain graph has example peak compression $P_{Cx2}$ and example peak tension $P_{Tx2}$ regions that are wider than those for the first diaphragm strain sensor 1002.

Figure 14A:
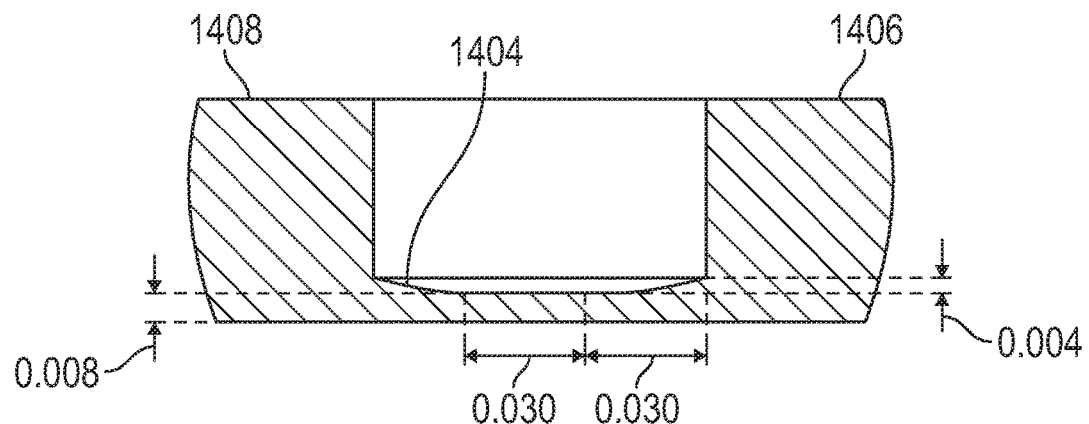
Figure 14B:
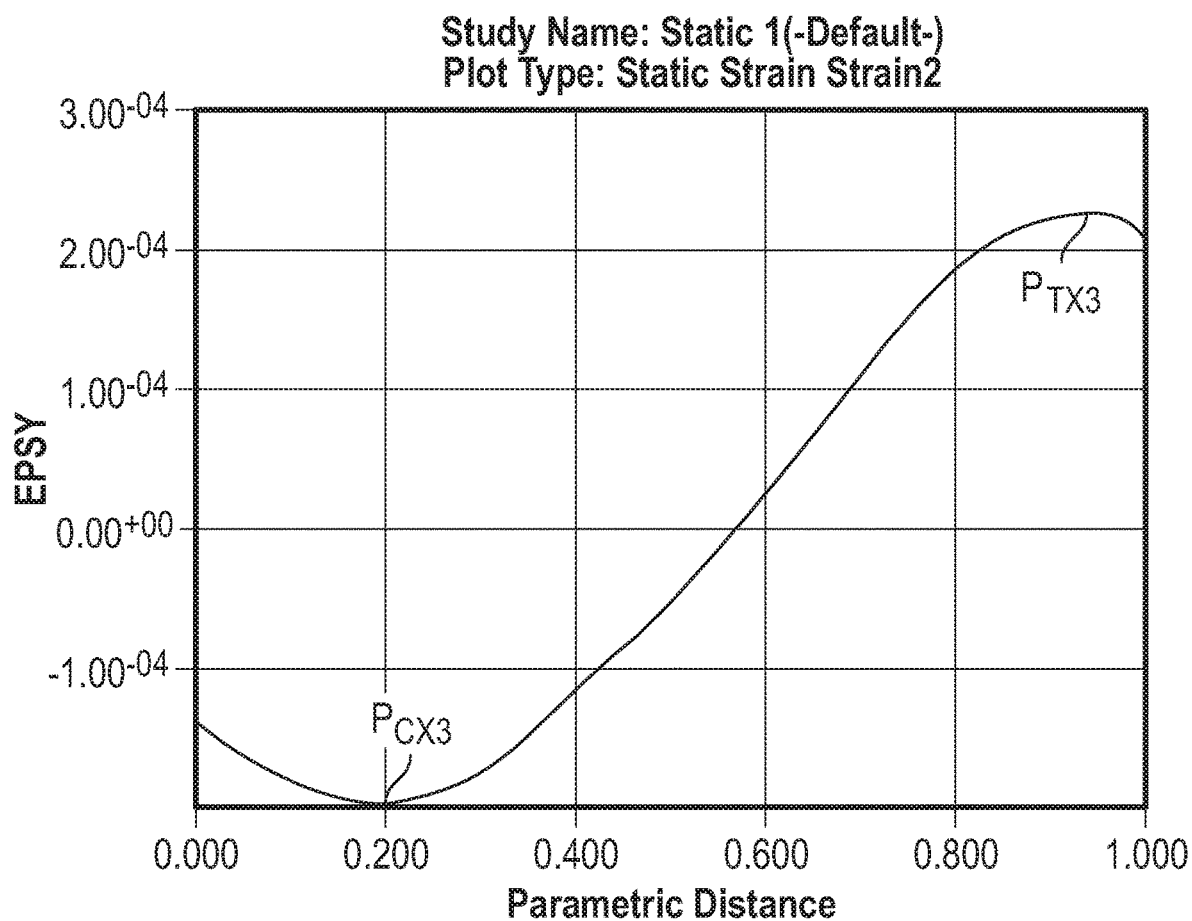

FIG. 14A is an illustrative enlarged side view of a portion of a third diaphragm 1202. Thickness of the third diaphragm 1204 varies from 0.008 at the center of the third diaphragm to 0.012 at the inner and outer support regions 1208, 1206. The third diaphragm 1204 has a flat middle section contour with a length of about $\frac{1}{3}^{rd}$ the span of the diaphragm web and has an inclined profile of increasing thickness between the flat center portion of the diaphragm and the inner and outer support regions 1208, 1206, FIG. 14B shows that a third example strain graph has example peak compression $P_{Cx3}$ and example peak tension $P_{Tx3}$ regions that are wider than those for the first diaphragm strain sensor 1002.

Figure 15A:
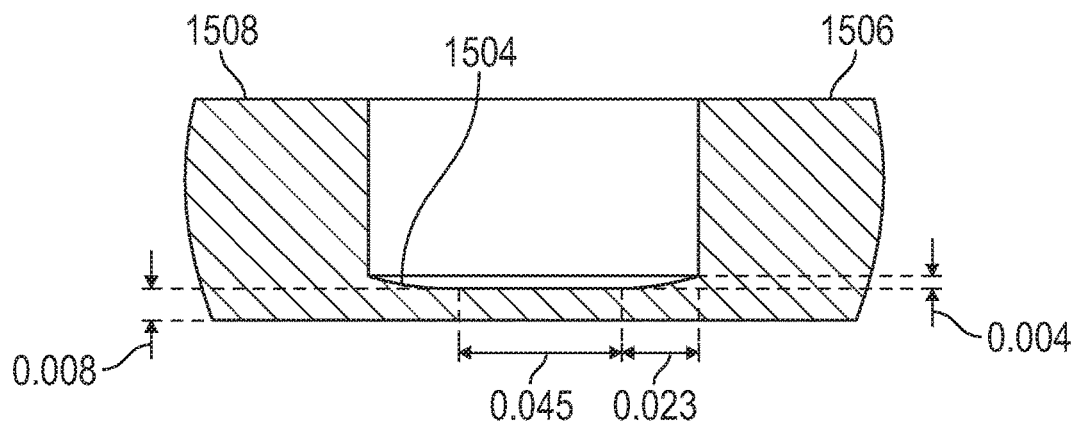
Figure 15B:
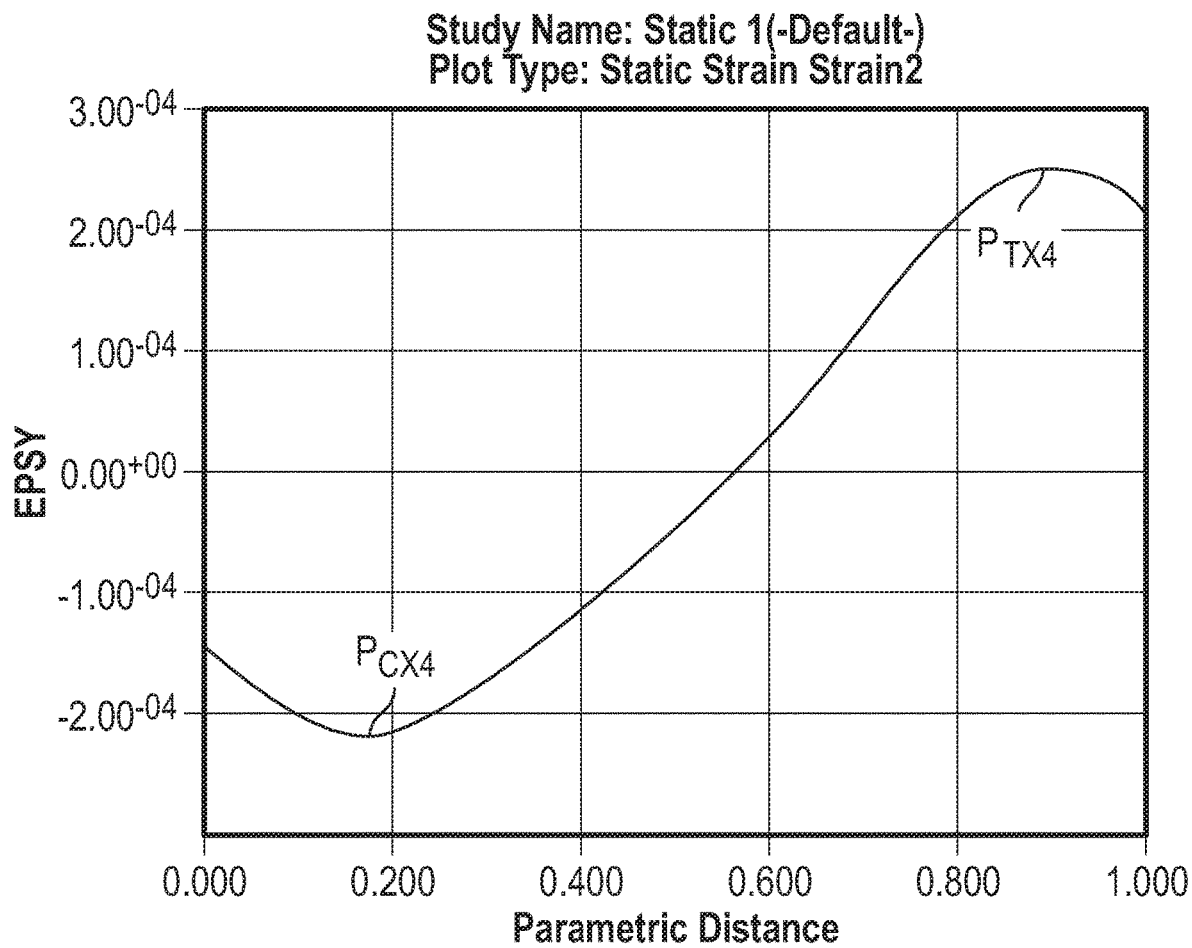

FIG. 15A is an illustrative enlarged side view of a portion of a fourth diaphragm 1302. Thickness of the fourth diaphragm 1304 varies from 0.008 at the center of the fourth diaphragm to 0.012 at the inner and outer support regions 1308, 1306. The fourth diaphragm 1304 has a flat middle section contour with a length of about one half the span of the diaphragm web and has an inclined profile of increasing thickness between the flat center portion of the diaphragm and the inner and outer support regions 1308, 1306. FIG. 15B shows that a fourth example strain graph has example peak compression $P_{Cx4}$ and example peak tension $P_{Tx4}$ regions that are wider than those for the first diaphragm strain sensor 1002.

Figure 16A:
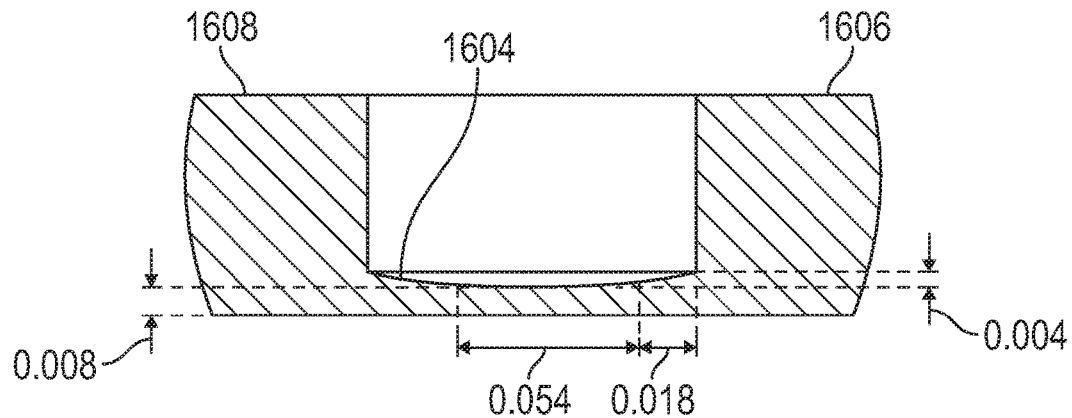
Figure 16B:
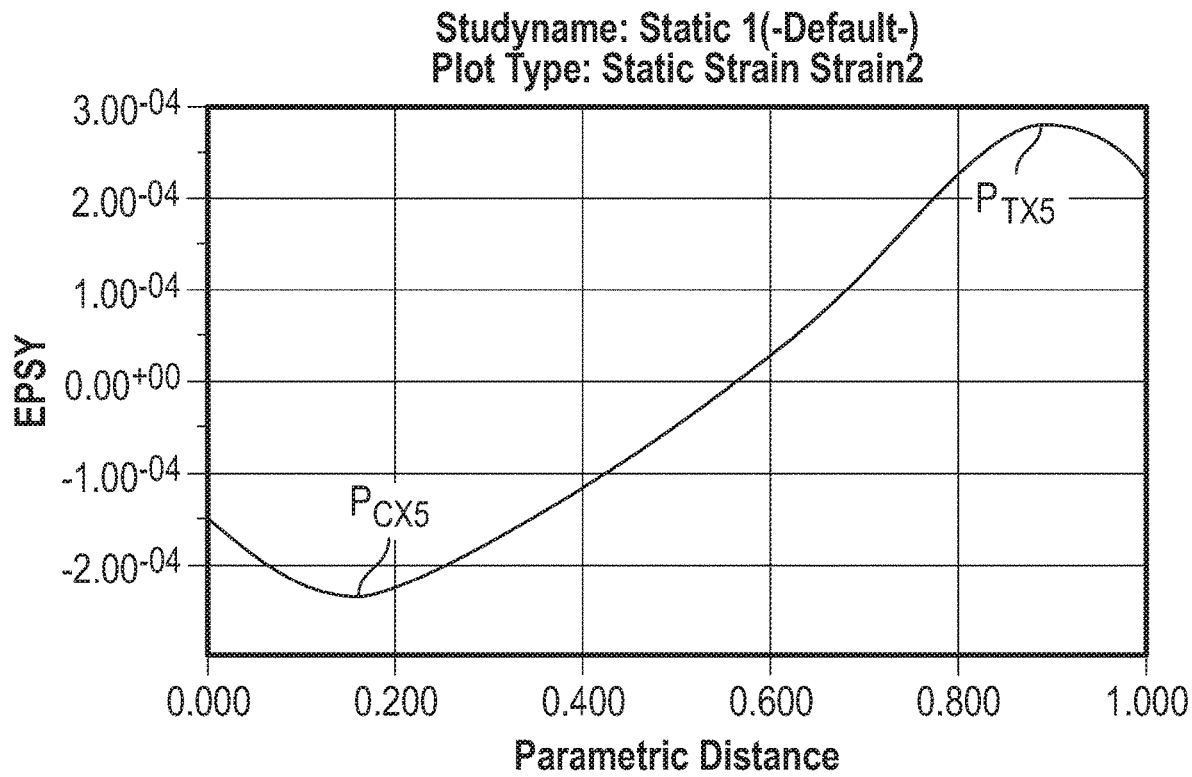

FIG. 16A is an illustrative enlarged side view of a portion of a fifth diaphragm 1402. Thickness of the fifth diaphragm 1404 varies from 0.008 at the center of the fifth diaphragm to 0.012 at the inner and outer support regions 1408, 1406. The fifth diaphragm 1404 has a flat middle section contour with a length of about $\frac{3}{5}$ths the span of the diaphragm web and has an inclined profile of increasing thickness between the flat center portion of the diaphragm and the is inner and outer support regions 1408, 1406. FIG. 16B shows that a fifth example strain graph has example peak compression $P_{Cx5}$ and example peak tension $P_{Tx5}$ regions that are wider than those for the first diaphragm strain sensor 1002.

Figure 17A:
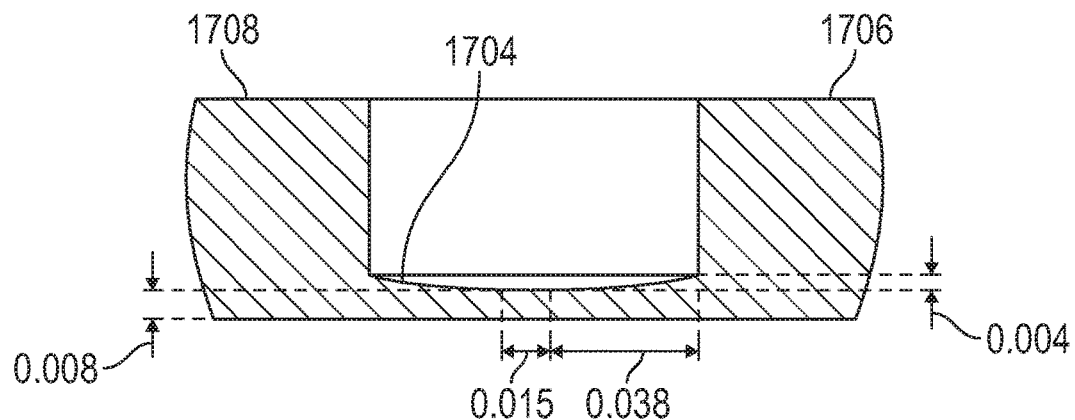
Figure 17B:
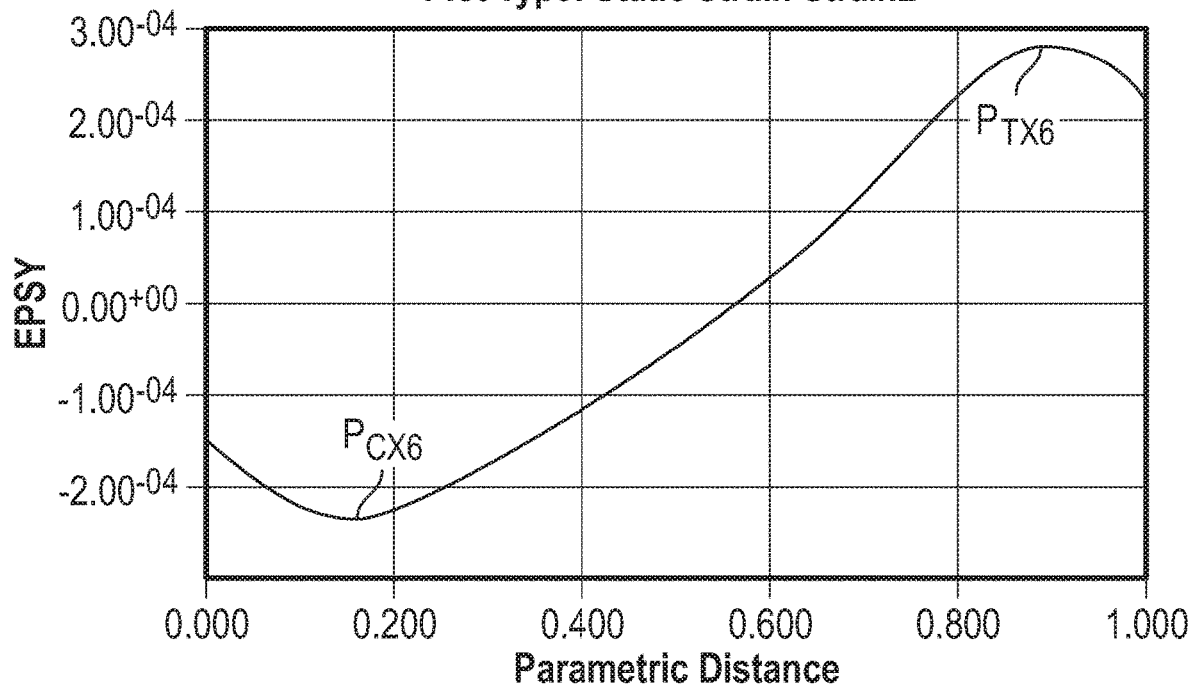

FIG. 17A is an illustrative enlarged side view of a portion of a sixth diaphragm 1502. Thickness of the sixth diaphragm 1504 varies from 0.008 at the center of the sixth diaphragm to 0.012 at the inner and outer support regions 1508, 1506. The sixth diaphragm 1504 has a flat middle section contour with a length of about $\frac{1}{6}$th the span of the diaphragm web and has an inclined profile of increasing thickness between the flat center portion of the diaphragm and the inner and outer support regions 1508, 1506. FIG. 17B shows that a sixth example strain graph has example peak compression $P_{Cx6}$ and example peak tension $P_{Tx6}$ regions that are wider than those for the first diaphragm strain sensor 1002.

Figure 18A:
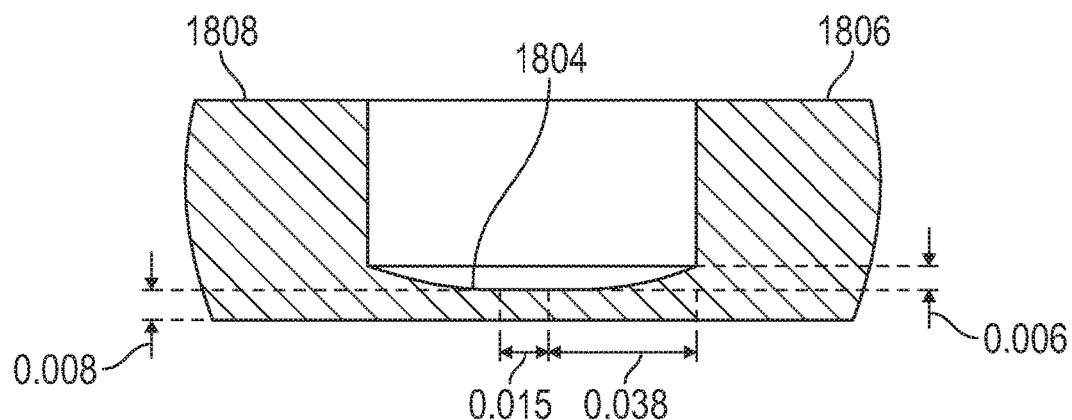
Figure 18B:
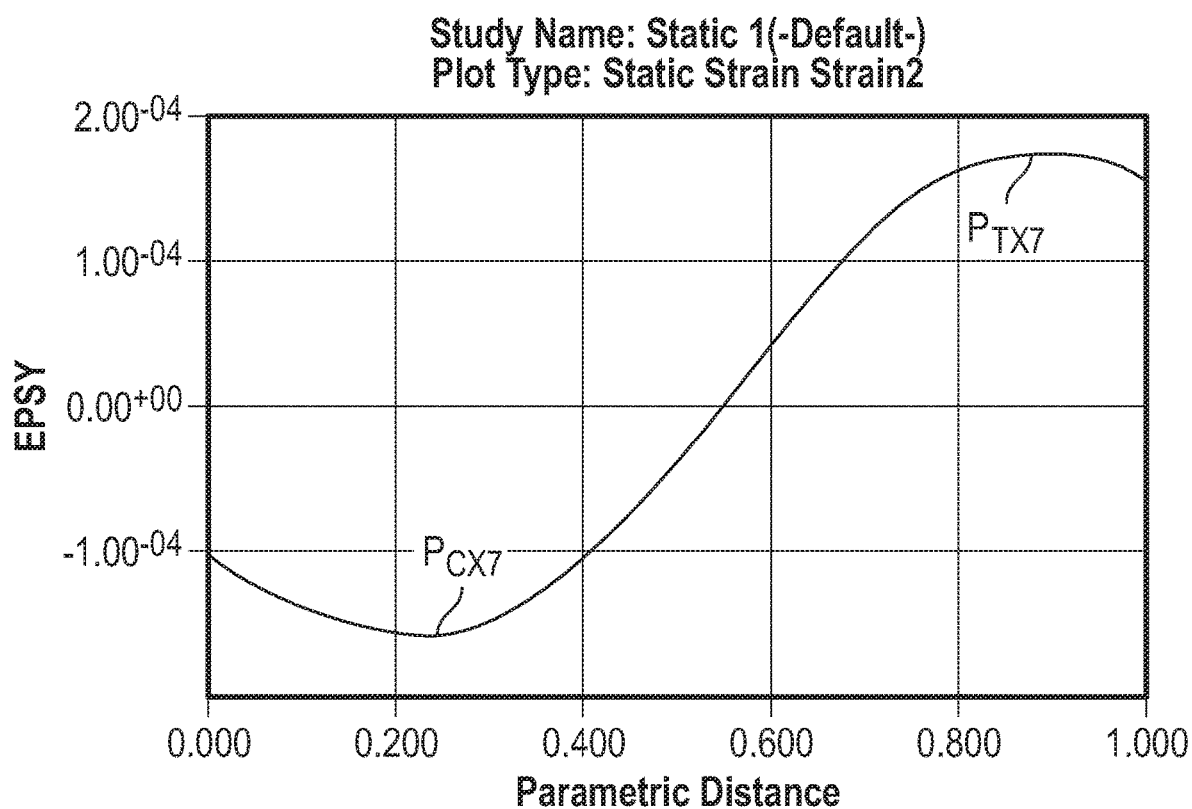

FIG. 18A is an illustrative enlarged side view of a portion of a seventh diaphragm 1602. Thickness of the seventh diaphragm 1604 varies from 0.008 at the center of the seventh diaphragm 1604 to 0.014 at the inner and outer support regions 1608, 1606. The seventh diaphragm 1604 has a flat middle section contour with a length of about $\frac{1}{6}$th the span of the diaphragm web and has an inclined profile of increasing thickness between the flat center portion of the diaphragm and the inner and outer support regions 1608, 1606. FIG. 18B shows that a seventh example strain graph has example peak compression $P_{Cx7}$ and example peak tension $P_{Tx7}$ regions that are wider than those for the first diaphragm strain sensor 1002.

Figure 19A:
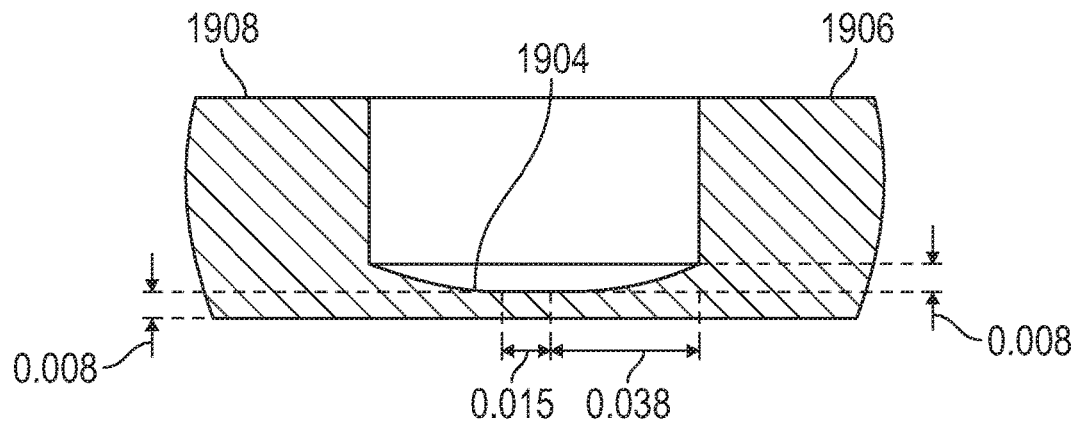
Figure 19B:
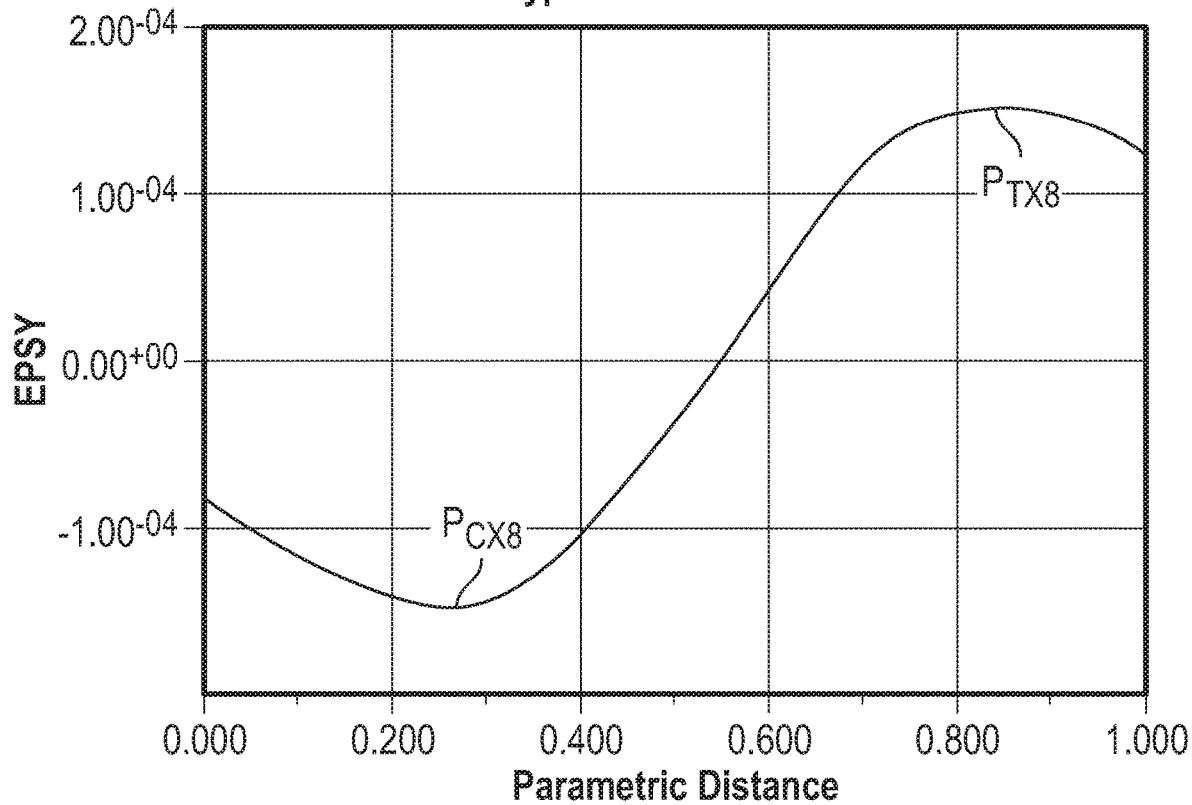

FIG. 19A is an illustrative enlarged side view of a portion of an eighth diaphragm 1702. Thickness of the eighth diaphragm 1704 varies from 0.008 at the center of the seventh diaphragm 1704 to 0.016 at the inner and outer support regions 1708, 1706. The eighth diaphragm 1704 has a flat middle section contour with a length of about $\frac{1}{6}$th the span of the diaphragm web and has an inclined profile of increasing thickness between the flat center portion and the inner and outer support regions 1708, 1706. FIG. 19B shows that an eighth example strain graph has example peak compression $P_{Cx8}$ and example peak tension $P_{Tx8}$ regions that are wider than those for the first diaphragm strain sensor 1002. The inventors realized that an inclined profile of increasing diaphragm thickness in regions where strain is concentrated increases the areas of maximum tensile and compressive strain, which achieves wider regions of uniform strain. The optimum diaphragm profile will depend on many factors including diaphragm size, gauge size, maximum load, material, and other factors such as the desired fatigue life.

Figure 20:
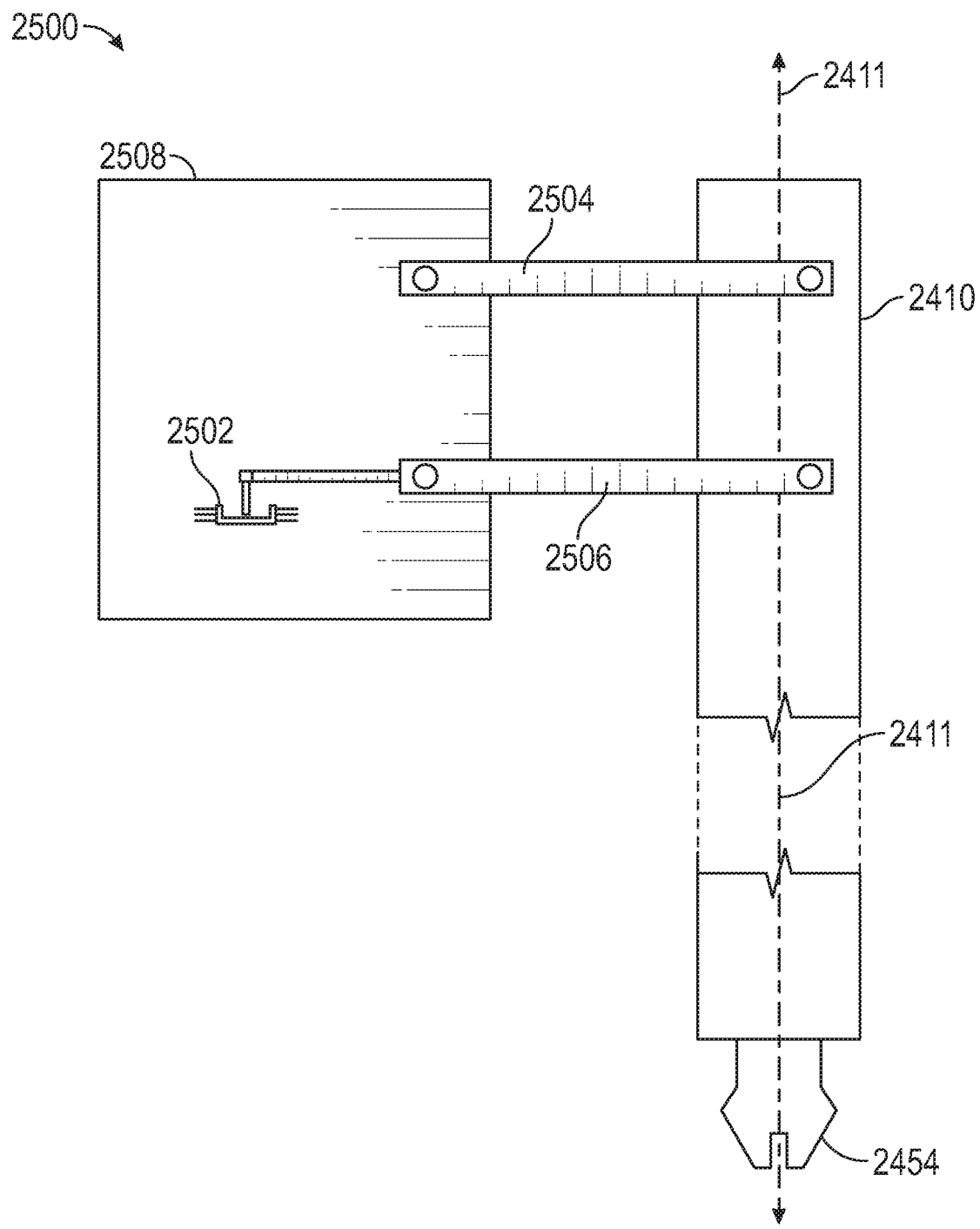
FIG. 20 is an illustrative schematic diagram of an example four-bar linkage coupled to an example contoured diaphragm force sensor.

FIG. 20 is an illustrative schematic diagram of an example four-bar linkage 2500 coupled to an example contoured diaphragm force sensor 2502. The example four-bar linkage 2500 includes a first (upper) side link 2504, a second (lower) side link 2506, tool carriage 2508 that acts as a third link ('tool carriage link'), and a tool shaft 2410 that acts as a fourth link ('tool shaft link'). The tool shaft link 2410 has a center axis 2411. An end effector 2454 extends from a distal end portion of the tool shaft link 2410. The first side link 2504 and the second side link 2506 each is pivotally coupled to the tool carriage link 2508 and to the tool shaft link 2410. Upward motion of the tool shaft link 2410, parallel to the center axis 2411, causes a rocking motion of the first and second side links 2504, 2506 in which respective side link end portions that pivot at the tool shaft link 2410 move upward, and respective side link end portions that pivot at the carriage 2508 move downward. The downward motion of the second (lower) side link 2506 imparts a force to the contoured diaphragm force sensor 2502 causes the sensor to flex. A measure of the amount of flexure provides a measure of a force imparted to the tool shaft link 2410 to cause it to move axially upward.

The above description is presented to enable any person skilled in the art to create and use a diaphragm force sensor having a thickness contoured to spread peak compression strain and spread peak tension strain. Various modifications to the examples will be readily apparent to those skilled in the art, and the generic principles defined herein may be applied to other examples and applications without departing from the scope of the invention. In the preceding description, numerous details are set forth for the purpose of explanation. However, one of ordinary skill in the art will realize that the examples in the disclosure might be practiced without the use of these specific details. In other instances, well-known processes are shown in block diagram form in order not to obscure the description of the invention with unnecessary detail. Identical reference numerals may be used to represent different views of the same or similar item in different drawings. Moreover, the terms horizontal and vertical are used herein for convenience and do not imply any particular orientation of the diaphragm in use. Thus, the foregoing description and drawings of examples in accordance with the present invention are merely illustrative of the principles of the invention. Therefore, it will be understood that various modifications can be made to the examples by those skilled in the art without departing from the scope of the invention, which is defined in the appended claims.

What is claimed is:

1. A force sensor comprising:
an annular diaphragm integrally secured between an outer support region and an inner support region;
wherein the annular diaphragm includes an annular outer portion, an annular inner portion, and an annular intermediate portion between the annular outer portion and the annular inner portion;
wherein the annular intermediate portion has a thickness that is less than a thickness of the outer support region;
wherein the annular intermediate portion has a thickness that is less than a thickness of the inner support region;
wherein the annular outer portion has a thickness that increases with increasing radial distance from the annular intermediate portion;
wherein the annular inner portion has a thickness that increases with increasing radial distance from the annular intermediate portion;
a first strain gauge at the annular outer portion; and
a second strain gauge at the annular inner portion;
wherein the annular diaphragm has a continuous curved first surface between the outer support region and the inner support region and an opposite-facing planar second surface; and
wherein the first and second strain gauges are at the planar second surface.

2. The force sensor of claim 1, wherein:
the force sensor further comprises a beam at the inner support region and extending perpendicular to the annular diaphragm.

3. The force sensor of claim 1, wherein:
at least one of the annular outer portion and the annular inner portion has a median slope of tapering of diaphragm thickness in a range between 0.5 in/in and 0.05 in/in.

4. The force sensor of claim 1, wherein:
at least one of the annular outer portion and the annular inner portion has a median slope of tapering of diaphragm thickness in a range between 0.05 in/in to 2 in/in.

5. The force sensor of claim 1, wherein:
the force sensor further comprises a link having a first end portion and a second end portion opposite the first end portion;
the first end portion of the link is coupled to the inner support region; and
the link is arranged such that a movement of the first end portion of the link in a direction toward the annular diaphragm causes a strain in the first and second strain gauges.

6. A force sensor comprising:
an annular diaphragm, a first strain gauge, and a second strain gauge;
wherein the annular diaphragm includes
an outer perimeter,
an inner perimeter,
an outer annular portion having a tapered thickness that increases with decreasing radial distance from the outer perimeter,
an inner annular portion having a tapered thickness that increases with decreasing radial distance from the inner perimeter,
a continuous curved first surface between the outer annular portion and the inner annular portion, and
a planar second surface opposite-facing from the continuous curved first surface;
wherein the first strain gauge is at the outer annular portion;
wherein the second strain gauge is at the inner annular portion; and
wherein the first and second strain gauges are at the planar second surface.

7. The force sensor of claim 6, wherein:
at least one of the outer annular portion and the inner annular portion has a median slope of tapering of thickness in a range between 0.5 in/in and 0.05 in/in.

8. The force sensor of claim 6, wherein:
at least one of the outer annular portion and the inner annular portion has a median slope of tapering of thickness in a range between 0.05 in/in to 2 in/in.

9. The force sensor of claim 6, wherein:
the outer annular portion is contoured to concentrate peak strain during deflection of the annular diaphragm;
the annular diaphragm has an overall radial width; and
the outer annular portion and the inner annular portion each have a radial width at least 15 percent of the overall radial width of the annular diaphragm.

10. A force sensor comprising:
a first beam, a second beam, a first strain gauge, a second strain gauge, a third strain gauge, and a fourth strain gauge;
wherein the first beam includes a first end region, a second end region, a center region between the first end region and the second end region, a first intermediate region between the first end region and the center region, and a second intermediate region between the second end region and the center region;
wherein the first intermediate region has a thickness, and the first end region and the center region each have a thickness larger than the thickness of the first intermediate region;
wherein the second intermediate region has a thickness, and the second end region and the center region each have a thickness larger than the thickness of the second intermediate region;
wherein the first intermediate region includes a first outer portion of tapered thickness that increases with increasing distance from the center region, and a first inner portion of tapered thickness that increases with increasing distance from the first end region;
wherein the second intermediate region includes
a second outer portion of tapered thickness that increases with increasing distance from the center region, and
a second inner portion of tapered thickness that increases with increasing distance from the second end region;

wherein the first intermediate region has a continuous curved surface between the first end region and the center region;

wherein the second intermediate region has a continuous curved surface between the second end region and the center region;

wherein a longitudinal axis of the first beam is defined by the first end region and the second end region of the first beam, and the second beam is coupled to the center region of the first beam and extends perpendicular to the longitudinal axis of the first beam;

wherein the first strain gauge is within the first outer portion;

wherein the second strain gauge is within the second outer portion;

wherein the third strain gauge is within the first inner portion; and wherein the fourth strain gauge is within the second inner portion.

11. The force sensor of claim 10, wherein:

a planar surface is defined on the first beam opposite-facing from the continuous curved surface; and the first, second, third, and fourth strain gauges are at the planar surface.

12. The force sensor of claim 10, wherein:

the second beam extends perpendicular to the first beam at a longitudinal midpoint of the first beam.

13. The force sensor of claim 10, wherein:

at least one of the first outer portion of tapered thickness and the first inner portion of tapered thickness has a median slope of tapering of thickness in a range between 0.5 in/in and 0.05 in/in.

14. The force sensor of claim 10, wherein:

at least one of the first outer portion of tapered thickness and the first inner portion of tapered thickness has a median slope of tapering of thickness in a range between 0.5 in/in and 0.05 in/in; and at least one of the second outer portion of tapered thickness and the second inner portion of tapered thickness has a median slope of tapering of thickness in a range between 0.5 in/in and 0.05 in/in.

15. The force sensor of claim 10, wherein:

at least one of the first outer portion of tapered thickness and the first inner portion of tapered thickness has a median slope of tapering of thickness in a range between 0.05 in/in to 2 in/in.

16. The force sensor of claim 10, wherein:

at least one of the first outer portion of tapered thickness and the first inner portion of tapered thickness has a median slope of tapering of thickness in a range between 0.05 in/in to 2 in/in; and at least one of the second outer portion of tapered thickness and the second inner portion of tapered thickness has a median slope of tapering of thickness in a range between 0.05 in/in to 2 in/in.

17. The force sensor of claim 10, wherein:

the first intermediate region has an overall width; and the first outer portion of tapered thickness and the first inner portion of tapered thickness each have a width that is at least 15 percent of the overall width of the first intermediate region.

18. The force sensor of claim 10, wherein:

the force sensor further comprises a link;

the link comprises a first end portion coupled to the second beam; and the link is arranged such that a movement of the first end portion of the link in a direction toward the first beam causes a strain in the first, second, third, and fourth strain gauges.

* * * * *